(12) United States Patent
Lou et al.

(10) Patent No.: US 11,895,517 B2
(45) Date of Patent: Feb. 6, 2024

(54) ENHANCED FRAGMENTED SECTOR LEVEL SWEEP PROCEDURE IN MMW WLAN SYSTEMS

(71) Applicant: INTERDIGITAL PATENT HOLDINGS, INC., Wilmington, DE (US)

(72) Inventors: Hanqing Lou, Syosset, NY (US); Xiaofei Wang, North Caldwell, NJ (US); Li-Hsiang Sun, San Diego, CA (US); Oghenekome Oteri, San Diego, CA (US); Rui Yang, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/586,329

(22) Filed: Jan. 27, 2022

(65) Prior Publication Data
US 2022/0150736 A1    May 12, 2022

Related U.S. Application Data

(63) Continuation of application No. 16/492,823, filed as application No. PCT/US2018/021709 on Mar. 9, 2018, now Pat. No. 11,252,587.

(Continued)

(51) Int. Cl.
*H04W 24/08* (2009.01)
*H04B 17/309* (2015.01)
(Continued)

(52) U.S. Cl.
CPC .......... *H04W 24/08* (2013.01); *H04B 17/309* (2015.01); *H04W 48/12* (2013.01); *H04B 7/0617* (2013.01)

(58) Field of Classification Search
CPC .... H04W 24/08; H04W 48/12; H04B 17/309; H04B 7/0617; H04B 7/0695;
(Continued)

(56) References Cited

U.S. PATENT DOCUMENTS

2010/0265925 A1    10/2010    Liu et al.
2015/0244432 A1*    8/2015    Wang .................. H04B 7/0417
375/267
(Continued)

FOREIGN PATENT DOCUMENTS

WO    2019/010404    1/2019

OTHER PUBLICATIONS

Maltsev et al.—"Enhanced SLS BF flow for efficient AP-STA access in dense environment", 802.11-17/xxxx (802.11-17/0067r1), Jan. 2017 (Year: 2017).*

(Continued)

*Primary Examiner* — Chi H Pham
*Assistant Examiner* — Ji-Hae Yea
(74) *Attorney, Agent, or Firm* — Volpe Koenig

(57) ABSTRACT

An enhanced sector level sweep procedure is provided herein. A method may include transmitting a plurality of beacon frames in a corresponding plurality of transmit sectors, wherein the plurality of beacon frames are transmitted within a beacon interval. The method may include receiving, from a second communication device, a first transmission including information indicating a first ranking. The first ranking is based on a characteristic of at least a first subset of the transmit sectors. The first transmission is received in a sector corresponding to one of the first subset of transmit sectors. The method may include receiving, from a third communication device, a second transmission including information indicating a second ranking. The second ranking is based on a characteristic of at least a second (Continued)

subset of the transmit sectors. The second transmission is received in a sector corresponding to one of the second subset of transmit sectors.

18 Claims, 14 Drawing Sheets

Related U.S. Application Data

(60) Provisional application No. 62/469,859, filed on Mar. 10, 2017.

(51) Int. Cl.
*H04W 48/12* (2009.01)
*H04B 7/06* (2006.01)

(58) Field of Classification Search
CPC ............ H04B 7/06952; H04B 7/06954; H04B 7/06956; H04B 7/06958; H04B 7/0696; H04B 7/06962; H04B 7/06964; H04B 7/06966; H04B 7/06968; H04B 17/346; H04B 17/347
See application file for complete search history.

(56) References Cited

U.S. PATENT DOCUMENTS

| | | | |
|---|---|---|---|
| 2015/0289147 | A1 | 10/2015 | Lou et al. |
| 2016/0191132 | A1 | 6/2016 | Rajagopal et al. |
| 2017/0064583 | A1 | 3/2017 | Roy et al. |
| 2017/0070275 | A1* | 3/2017 | Jo .......................... H04B 7/10 |
| 2019/0068271 | A1 | 2/2019 | Lou et al. |

OTHER PUBLICATIONS

Agilent Technologies, "Wireless LAN and 60 GHz—IEEE 802.11ad Explained," pp. 1-28 (May 20, 2013).
Chen et al., "MAC and PHY Proposal for 802.11af," IEEE 802.11-10/0258r0 (Mar. 2010).
Da Silva, "Proposed resolution to BF PHY and BRP TXSS related CIDs," IEEE 802.11-17/1298r0 (Sep. 11, 2017).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 7: Enhanced Throughput for Operation in License-Exempt Bands above 45 GHz, IEEE P802.11ay/D1.0 (Nov. 2017).
Draft Standard for Information technology—Telecommunications and information exchange between systems Local and metropolitan area networks—Specific Requirements—Part 11: Wireless LAN Medium Access Control (MAC) and Physical Layer (PHY) Specifications, IEEE P802.11-REVmd D1.0 (Feb. 2018).
Draft Standard for Information Technology—Telecommunications and Information exchange between systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz, IEEE P802.11ay/D0.2 (Jan. 2017).
Draft Standard for Information Technology—Telecommunications and information exchange between systems—Local and metropolitan area networks—Specific Requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Halasz, "Sub 1 GHz license-exempt PAR and 5C," IEEE P802.11 Wireless LANs, IEEE 802.11-10/0001r13 (Jul. 2010).
Handte et al., "Improvements to enhanced SLS beamforming—draft text," IEEE 802.11-17/0771r0 (May 2017).
Handte et al., "Improvements to enhanced SLS beamforming," IEEE 802.11-17/0770r0 (May 2017).
Huang et al., "Scheduling Allocation on Multi-channels in 11ay," IEEE 802.11-16/1208r0 (Sep. 13, 2016).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operations in Bands belwo 6GHz, IEEE Std. 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications, Amendment 5: Television White Spaces (TVWS) Operation, IEEE 802.11af-2013 (Dec. 11, 2013).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std. 802.11n-2009 (Sep. 2009).
Maltsev et al., "Draft text for asymmetric beamforming training procedure enhancements," IEEE 802.11-17/1422r1 (Sep. 8, 2017).
Maltsev et al., "Enhanced SLS BF flow for efficient AP-STA access in dense environment," 802.11-17/xxxx (802.11-17/0067r1) (Jan. 2017).
Sun et al., "IEEE 802.11 TGay Use Cases," IEEE 802.11-2015/0625r2 (May 2015).
Zhang, "Millimeter-Wave Wireless Networking and Sensing," ACM SIGCOMM (Aug. 2017).

* cited by examiner

ENHANCED FRAGMENTED SECTOR LEVEL SWEEP PROCEDURE IN MMW WLAN SYSTEMS

CROSS REFERENCE TO RELATED APPLICATION

This application is a continuation of U.S. patent application Ser. No. 16/492,823 filed Mar. 9, 2018, which issued as U.S. Pat. No. 11,252,587 on Feb. 15, 2022, which is the U.S. National Stage, under 35 U.S.C. § 371, of International Application No. PCT/US2018/021709 filed Mar. 9, 2018, which claims the benefit of U.S. provisional application No. 62/469,859 filed on Mar. 10, 2017, the contents of which are hereby incorporated by reference herein.

BACKGROUND

Communication networks like wireless local area network (WLAN) comprise an access point station (generally referred to as access point (AP), personal basic service set control point (PCP), or collectively PCP/AP) and other terminal stations (STAs). The access point stations like the PCP/AP transmit a beacon signal on a fixed channel to the STAs and the STAs also use the channel to establish connections with the PCP/AP.

Institute of Electrical and Electronics Engineers (IEEE) 802.11 standards are well-known WLAN standards. IEEE 802.11ad and IEEE 802.11ay are two examples of multiple amendments to IEEE 802.11 WLAN standards. IEEE 802.11ad and 802.11ay standards include a sector level sweep (SLS) procedure, and a beam refinement protocol (BRP) procedure. The SLS procedure may be used for transmit beamforming training; the BRP procedure may be used for receive beamforming training, and iterative refinement of both transmit and receive beams.

SUMMARY

An enhanced sector level sweep procedure is provided herein. A method may include transmitting a plurality of beacon frames in a corresponding plurality of transmit sectors, wherein the plurality of beacon frames are transmitted within a beacon interval. The method may include receiving, from a second communication device, a first transmission including information indicating a first ranking. The first ranking is based on a characteristic of at least a first subset of the transmit sectors. The first transmission is received in a sector corresponding to one of the first subset of transmit sectors. The method may include receiving, from a third communication device, a second transmission including information indicating a second ranking. The second ranking is based on a characteristic of at least a second subset of the transmit sectors. The second transmission is received in a sector corresponding to one of the second subset of transmit sectors.

BRIEF DESCRIPTION OF THE DRAWINGS

A more detailed understanding may be had from the following description, given by way of example in conjunction with the accompanying drawings wherein.

DETAILED DESCRIPTION

Figure 1A:
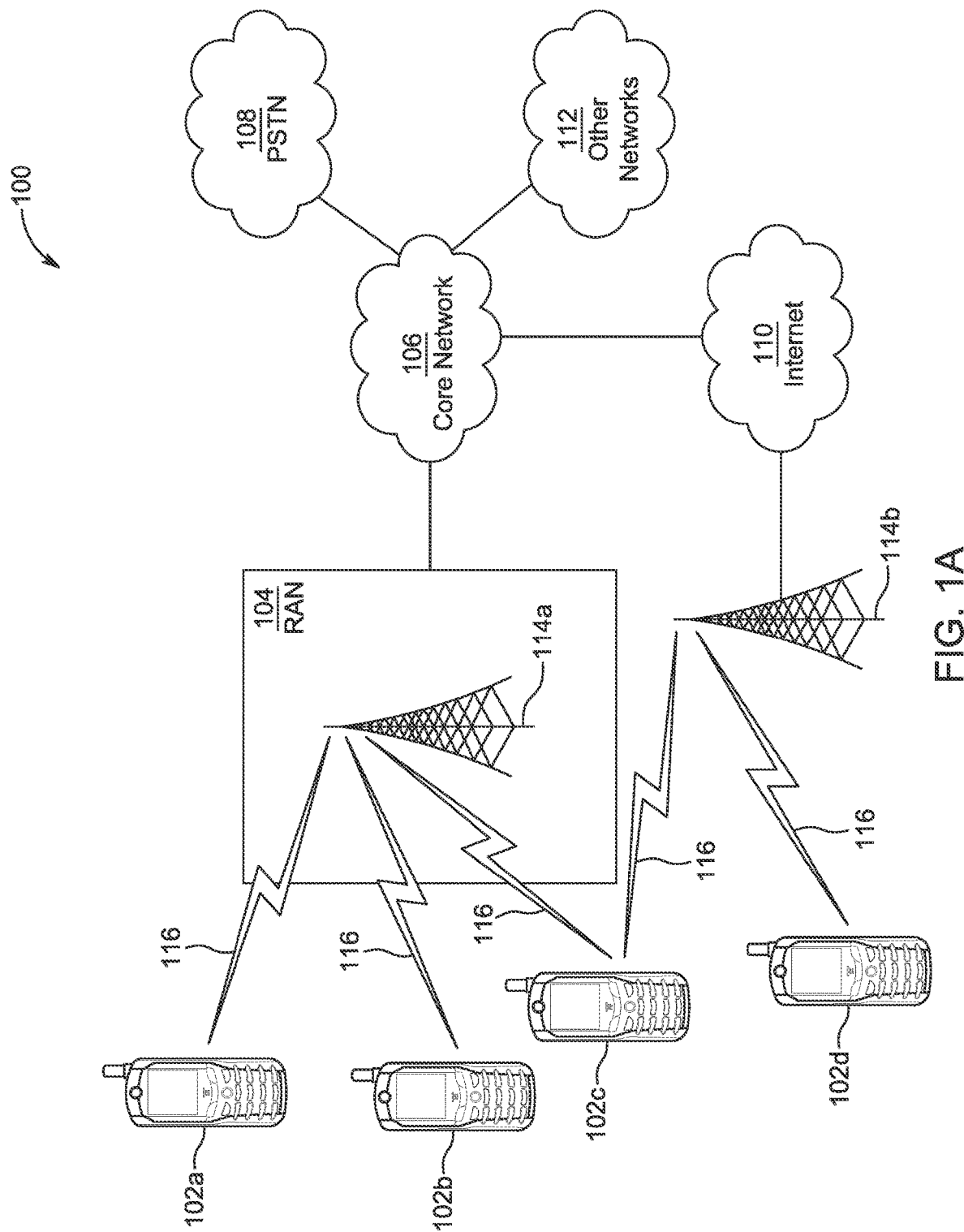
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements.

Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
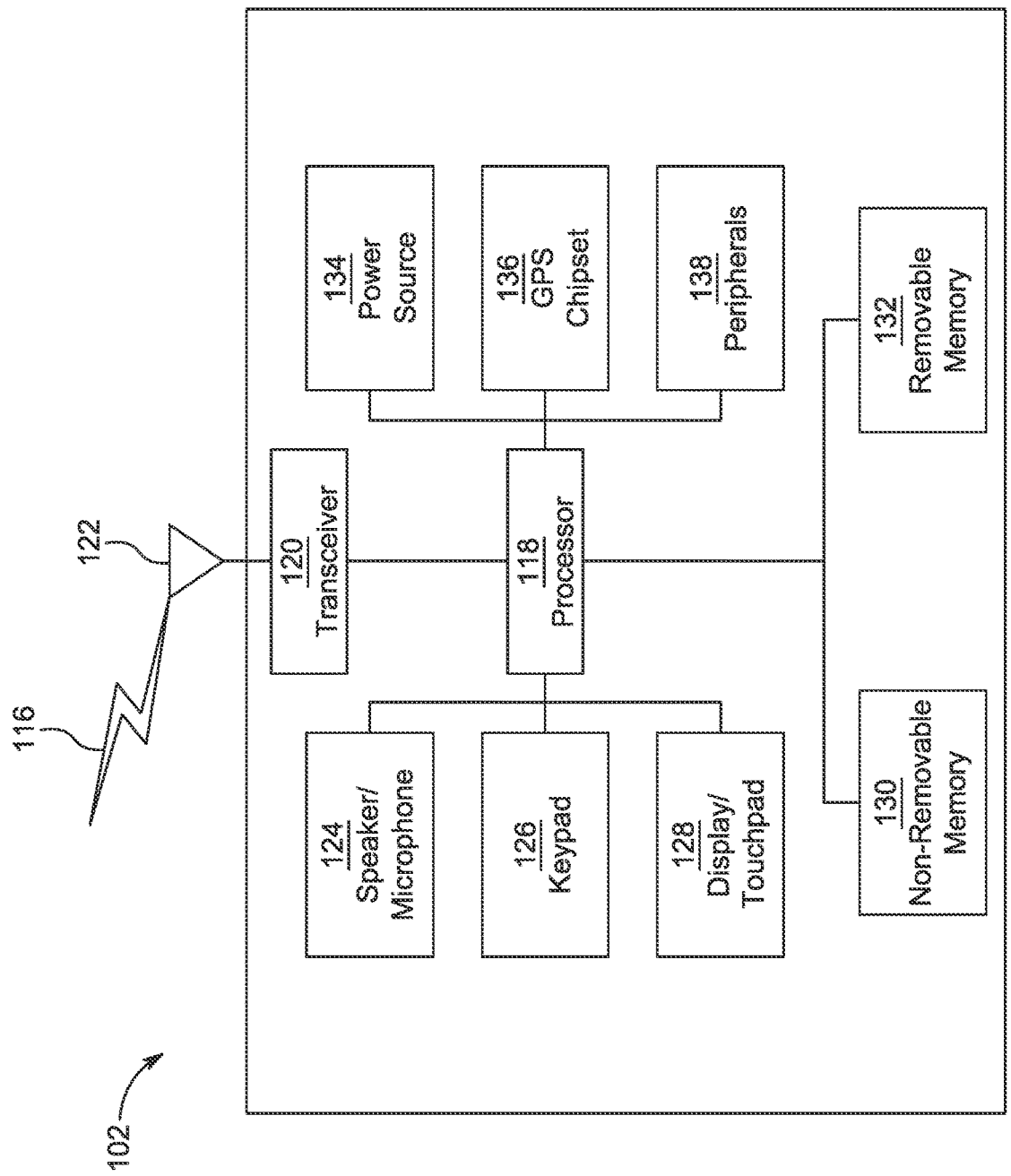
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
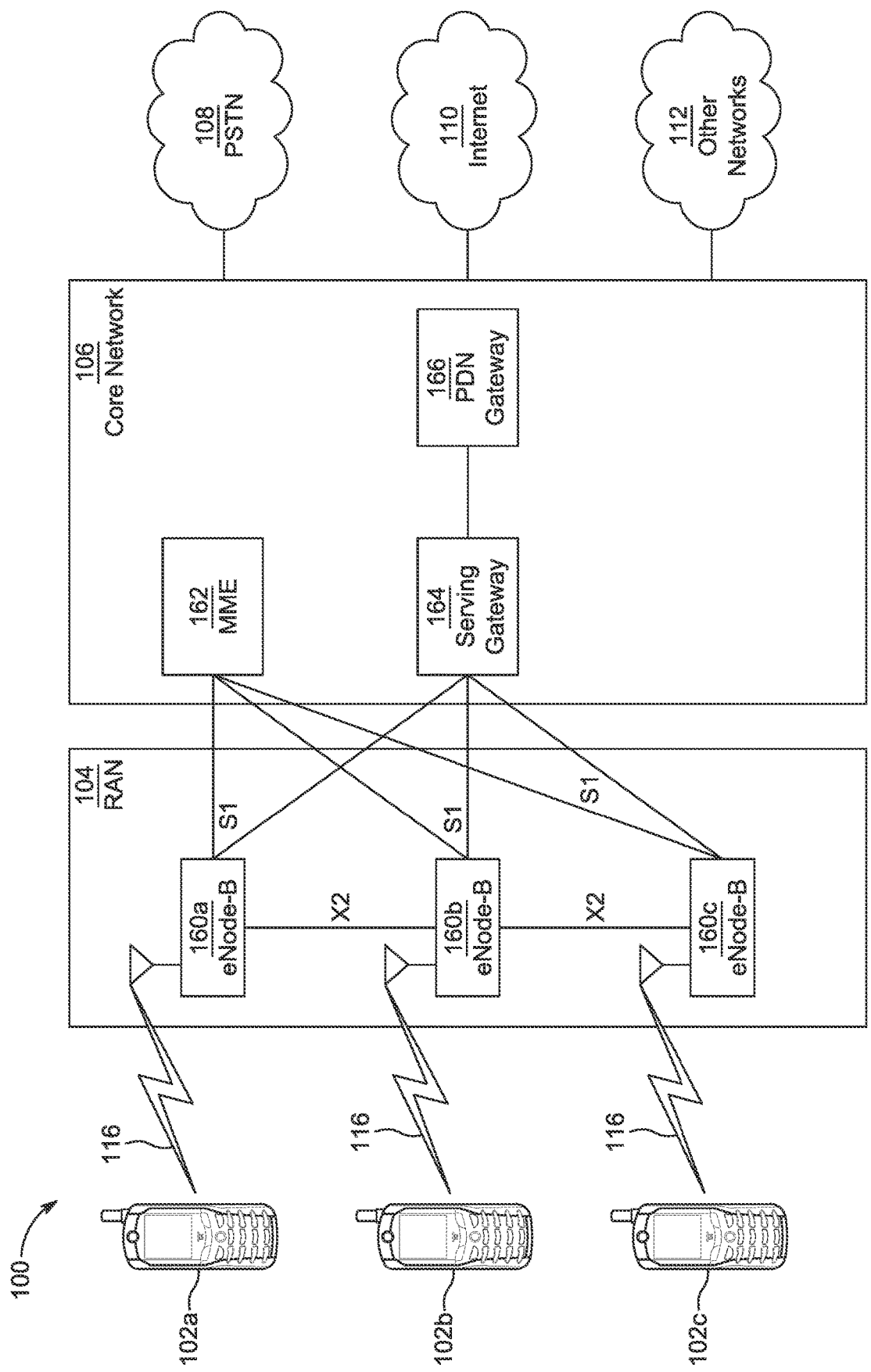
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
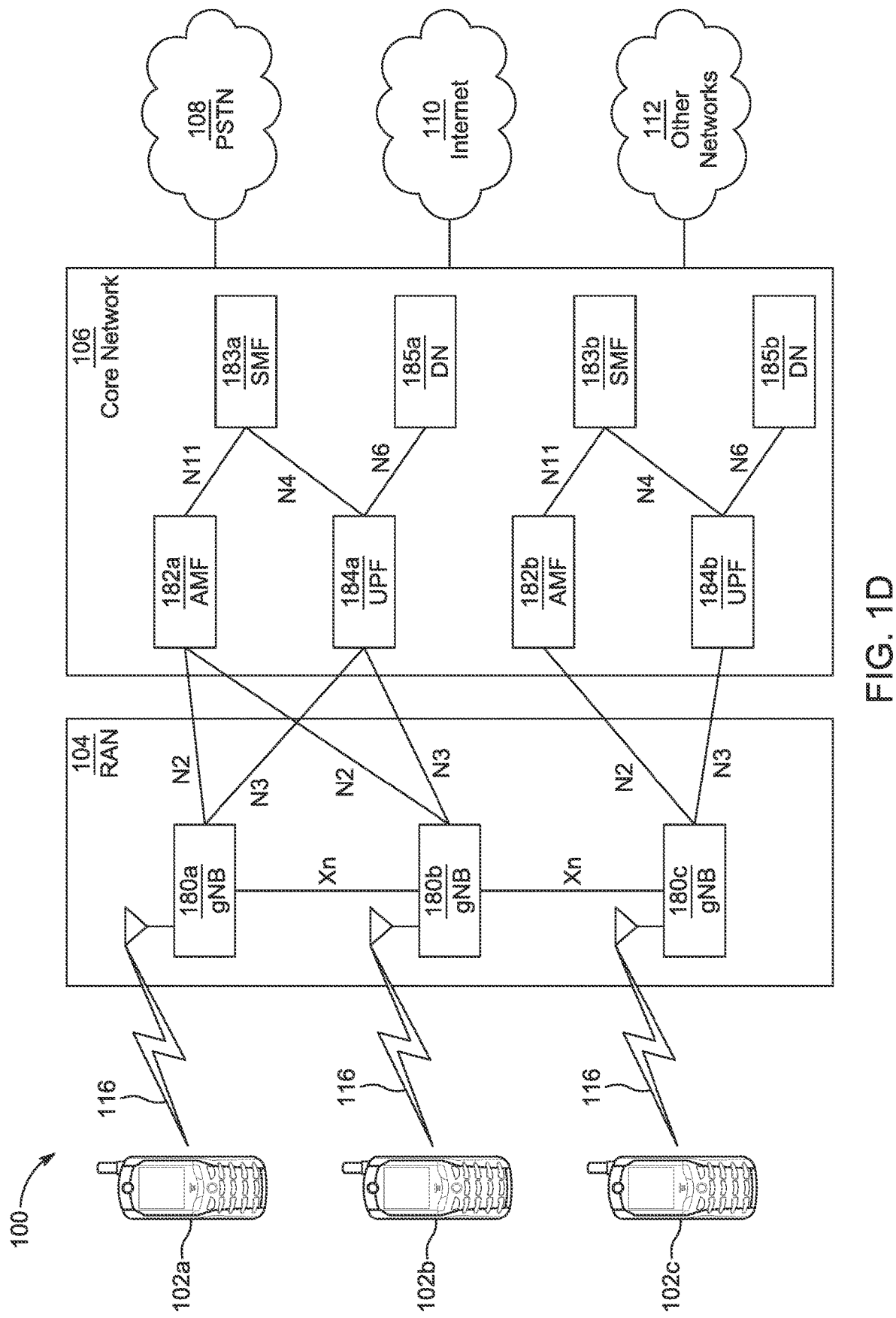
FIG. 1D is a system diagram illustrating a further example radio access network (RAN) and a further example core network (CN) that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

IEEE 802.11ad is an amendment to the WLAN standard, which specifies the MAC and PHY layers for very high throughput (VHT) in the 60 GHz band. Operating over the unlicensed 60 GHz frequency band, it allows devices to communicate without wires at multi-gigabit per second speeds. IEEE 802.11ad standard defines a channel access scheme that allows users for near real time data transmission (e.g., up to 7 Gbit/s). The 802.11ad supports data rates up to 7 Gbits/s, supports three different modulation modes, including Control PHY with single carrier and spread spectrum, Single Carrier PHY, and OFDM PHY, and uses the 60 GHz unlicensed band, which is available globally. At 60 GHz, the wavelength is 5 mm, which makes compact and antenna or antenna arrays possible. Such antennas may create narrow RF beams at both transmitter and receiver, which effectively increase the coverage range and reduce the interference.

IEEE 802.11ay aims to support a maximum throughput of at least 20 gigabits per second, while maintaining or improving the power efficiency per station. IEEE 802.11ay is expected to support multi-input multi-output (MIMO) transmissions like single user (SU) MIMO and multi user (MU) MIMO) and multi-channel transmission (including channel bonding and channel aggregation).

Features and elements described below are discussed based on IEEE 802.11ad and 802.11ay. However, one of ordinary skill in the art will appreciate that the two standards are just examples and the features and elements are not limited to those two standards.

Figure 2:
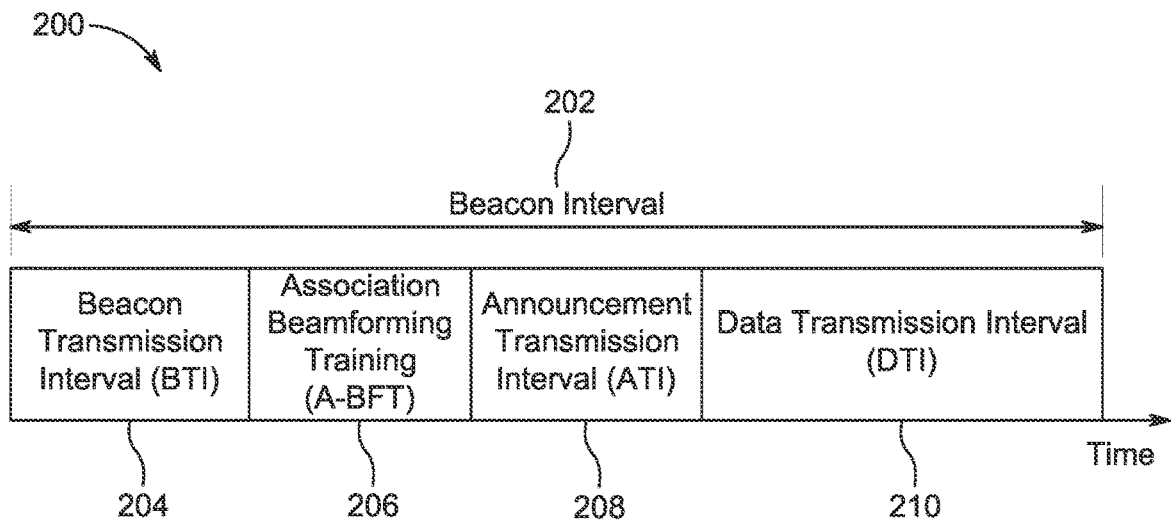
FIG. 2 is a signal diagram illustrating an exemplary IEEE 802.11ad/ay beacon interval (BI)

FIG. 2 is a signal diagram illustrating an exemplary IEEE 802.11ad/ay beacon interval (BI). In FIG. 2, as defined in IEEE 802.11ad and IEEE 802.11ay ("802.11ad/ay"), the beacon internal (BI) 202 may comprise a Beacon Header Interval (BHI) (1008 in FIG. 10) and a Data Transmission Interval (DTI) 210. The BHI may further comprise a Beacon Transmission Interval (BTI) 204, an Association Beamforming Training (A-BFT) 206, and an Announcement Transmission Interval (ATI) 208.

The BTI 204 may comprise multiple beacon frames (1044, 1046 in FIGS. 10 and 1226 in FIG. 12), each transmitted by the PCP/AP on a different sector of its antenna or antennas to cover all possible transmission directions. The BTI 204 may be used for network announcement and beamforming training of the PCP/AP's antenna sectors. Stations train their antenna sectors for communication with the PCP/AP during A-BFT 206. The PCP/AP exchanges management information with associated and beam-trained stations during the ATI 208.

In FIG. 2, the DTI 210 includes one or more contention-based access periods (CBAPs) or scheduled service periods (SPs) where stations exchange data frames. In each CBAP, multiple stations may contend for the channel according to IEEE 802.11 enhanced distributed coordination function (EDCF). An SP may be assigned in a DTI for communication between a dedicated pair of nodes as a contention free period.

The frame structure of 802.11ad/ay facilitates a mechanism for beamforming training like discovery and tracking. The beamforming training protocol may include two components: a sector level sweep (SLS) procedure, and a beam refinement protocol (BRP) procedure. The SLS procedure may be used for transmit beamforming training and the BRP procedure may be used for receive beamforming training, and iterative refinement of both transmit and receive beams. Through the BRP procedure, the STA may improve its antenna configuration (e.g., antenna weight vectors) for transmission and/or reception. That is, the BRP procedure is a process in which a STA trains its RX and TX antenna array(s) and improves its TX antenna configuration and RX antenna configuration using an iterative procedure. The BRP may be used regardless of the antenna configuration a STA supports. In an example, packets assigned for the BRP (BRP packets) are used to train the receiver and transmitter antenna of the STA.

Figure 3:
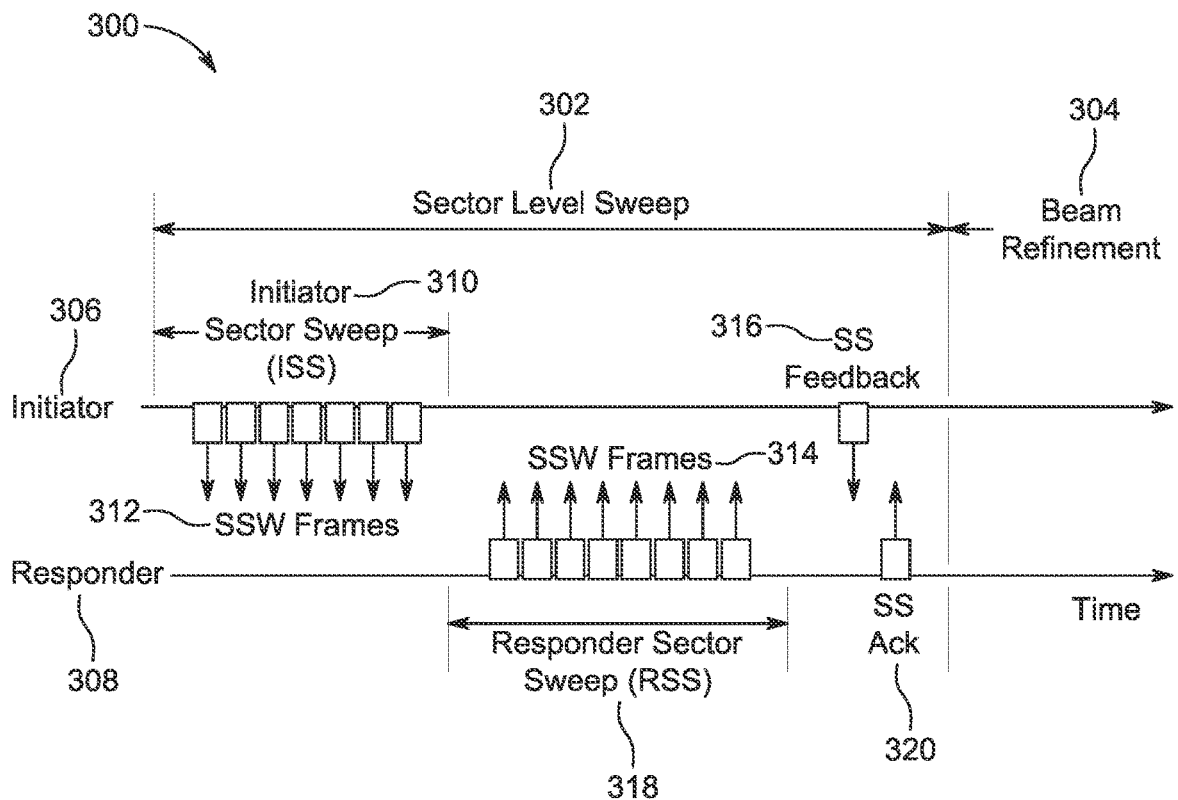
FIG. 3 is a signal diagram illustrating an exemplary sector level sweep (SLS) training procedure.

FIG. 3 is a signal diagram illustrating an exemplary sector level sweep (SLS) procedure. The station initiating the SLS 302 is referred to as the initiator 306 and the other station is referred to as the responder 308. During an Initial Sector Sweep (ISS) 310, the initiator 306 transmits one or more Sector Sweep (SSW) frames 312 to the responder 308. During a Responder Sector Sweep (RSS), the responder 308 transmits its one or more SSW frames 318 to the initiator 306. Afterwards, the initiator 306 sends a SS Feedback message 316 to the responder 308, while the responder 308 transmits a SS Ack message 320 to the initiator 306, in return.

During the SLS 302, different combinations of initiator antenna sectors and responder antenna sectors are tested to find a satisfactory combination. The SLS training may be performed using a beacon frame or an SSW frame 312. For example, SSW frames 312 are emitted sequentially by the different sectors of the initiator antenna.

When a beacon frame is used for the SLS training, the PCP/AP repeats the beacon frame over multiple beams/sectors within each Beacon Interval (BI) and multiple STAs may perform Beamforming (BF) training simultaneously. However, due to the size of the beacon frame, it may not be guaranteed that the PCP/AP may sweep all the sectors/beams within one BI. Thus a STA may need to wait multiple BIs to complete Initial Sector Sweep (ISS) training, and thus latency may be an issue.

Figure 4:
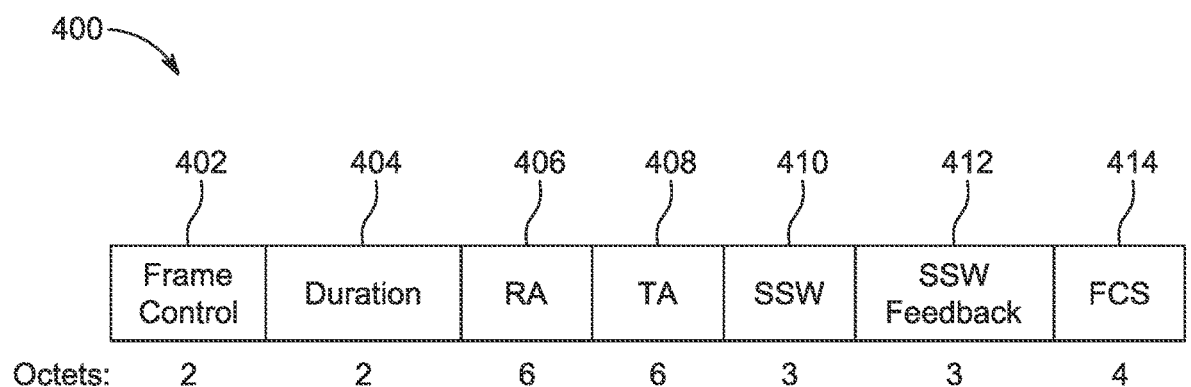
FIG. 4 is a block diagram illustrating an exemplary sector sweep (SSW) frame format by octet.

FIG. 4 is a block diagram illustrating an exemplary Sector Sweep (SSW) frame format by octet. The sector sweep (SSW) frame, as defined in 802.11ad standard, may comprise a Frame control field 402, a Duration field 404, a RA field 406, a TA field 408, a SSW field 410, a SSW Feedback field 412, and FCS field 414.

The Frame control field 402 may contain protocol version, type, sub type, control frame extension, power management, data, WEP, and order. The Duration field 404 is set to the time until the end of the SSW frame transmission that has the CDOWN subfield within the SSW field 410 equal to 0 or until the end of the current allocation. The RA field 406 contains the MAC address of the STA that is the intended receiver of the sector sweep. The TA field 408 contains the MAC address of the transmitter STA of the sector sweep frame. The SSW frame 400 may be utilized for point-to-point BF training and may be transmitted using control PHY.

Figure 5:
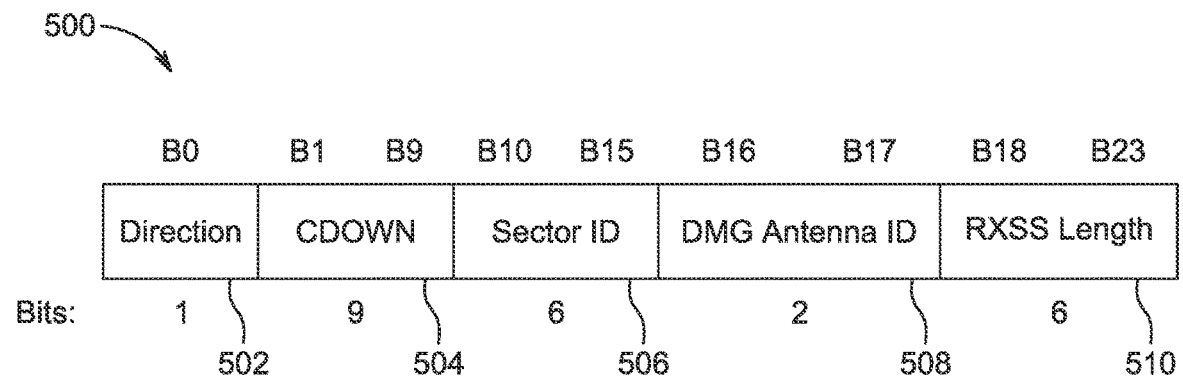
FIG. 5 is a block diagram illustrating an exemplary SSW field of the SSW frame by bits.

FIG. 5 is a block diagram illustrating an exemplary SSW field of the SSW frame by bits. It depicts the SSW field 410 of the SSW frame 400 in FIG. 4, which is also defined in 802.11ad. The SSW field 410 may comprise a Direction field 502, a CDOWN field, 504, a Sector ID field 506, a DMG Antenna ID field 508, and a RXSS Length field 510.

The Direction field 502 may be set to 0 to indicate that the frame is transmitted by the beamforming initiator and set to 1 to indicate that the frame is transmitted by the beamforming responder. The CDOWN field 504 may be a down-counter indicating the number of remaining DMG Beacon frame transmissions to the end of the TXSS, or the number of remaining SSW frame transmissions to the end of the TXSS/RXSS. This field may be set to 0 in the last frame DMG Beacon and SSW frame transmission. The Sector ID field 506 may be set to indicate the sector number through which the frame containing this SSW field is transmitted. The DMG Antenna ID field 508 indicates the DMG antenna the transmitter may be currently using for this transmission. The RXSS Length field 510 is valid only when transmitted in a CBAP and is reserved otherwise.

Figure 6:
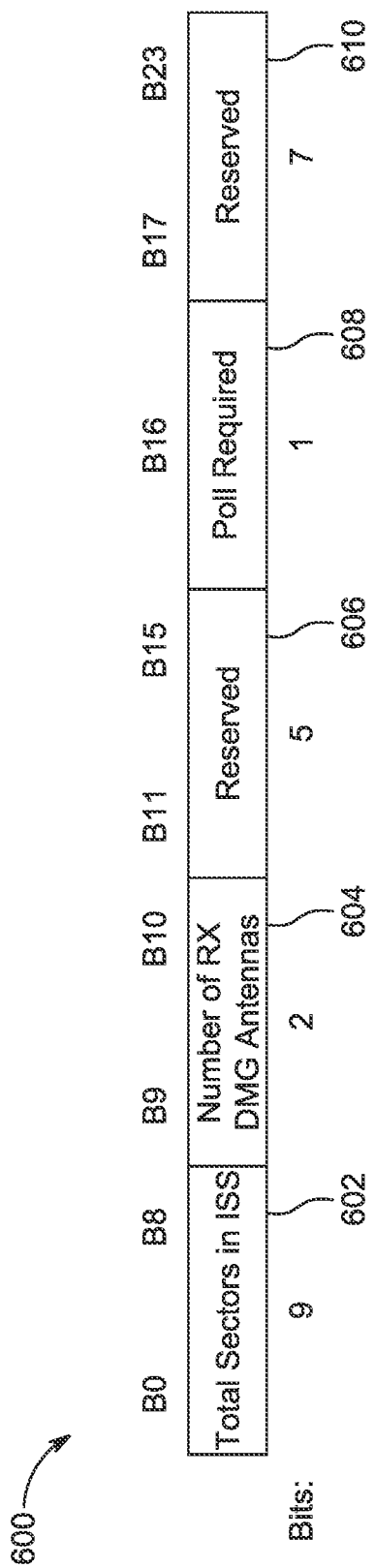
FIG. 6 is a block diagram illustrating one exemplary SSW Feedback field of the SSW frame by bits.
Figure 7:
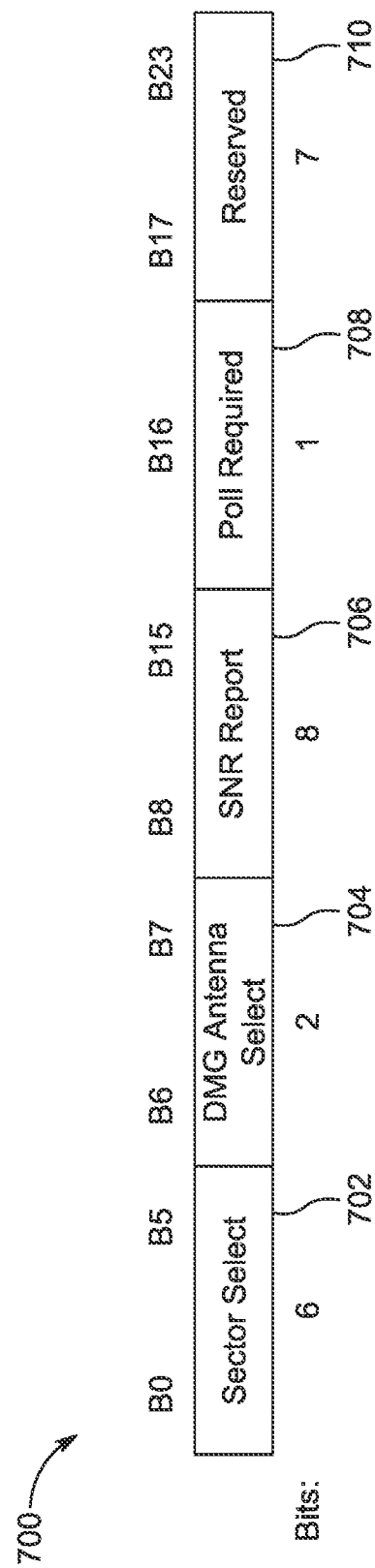
FIG. 7 is a block diagram illustrating another exemplary SSW Feedback field of the SSW frame by bits.

FIGS. 6 and 7 are block diagrams illustrating the SSW Feedback field 412 of the SSW frame 400 in FIG. 4. FIG. 6 depicts the format of the SSW Feedback field 412 that is transmitted as part of an ISS, which may comprise any one or the combination of the following subfields; a Total Sectors in ISS 602, a Number of RX DMG Antennas 604, a Poll Required 608, and Reserved fields 606, 610. Meanwhile, FIG. 7 depicts another format of the SSW Feedback field 412 when it is not transmitted as part of an ISS, which may contain some different subfields; a Sector Select 702, a DMG Antenna Select 704, a SNR Report 706, a Poll Required 708, and a Reserved field 710.

The Total Sectors in ISS subfield 602 in FIG. 6 indicates the total number of sectors that the initiator uses in the ISS, including any repetition performed as part of multi-antenna beamforming. The Number of RX DMG Antennas subfield 604 indicates the number of receive DMG antennas the initiator uses during the following RSS.

The Sector Select subfield 702 in FIG. 7 contains the value of the Sector ID subfield of the SSW field within the frame that was received with best quality in the immediately preceding sector sweep. The DMG Antenna Select subfield 704 indicates the value of the DMG Antenna ID subfield of the SSW field within the frame that was received with best quality in the immediately preceding sector sweep. The SNR Report subfield is set to the value of the SNR from the frame that was received with best quality during the immediately preceding sector sweep, and which is indicated in the sector select subfield.

The Poll Required subfield 708 is set to 1 by a non-PCP/non-AP STA to indicate that it requires the PCP/AP to initiate communication with the non-PCP/non-AP.

Figure 8:
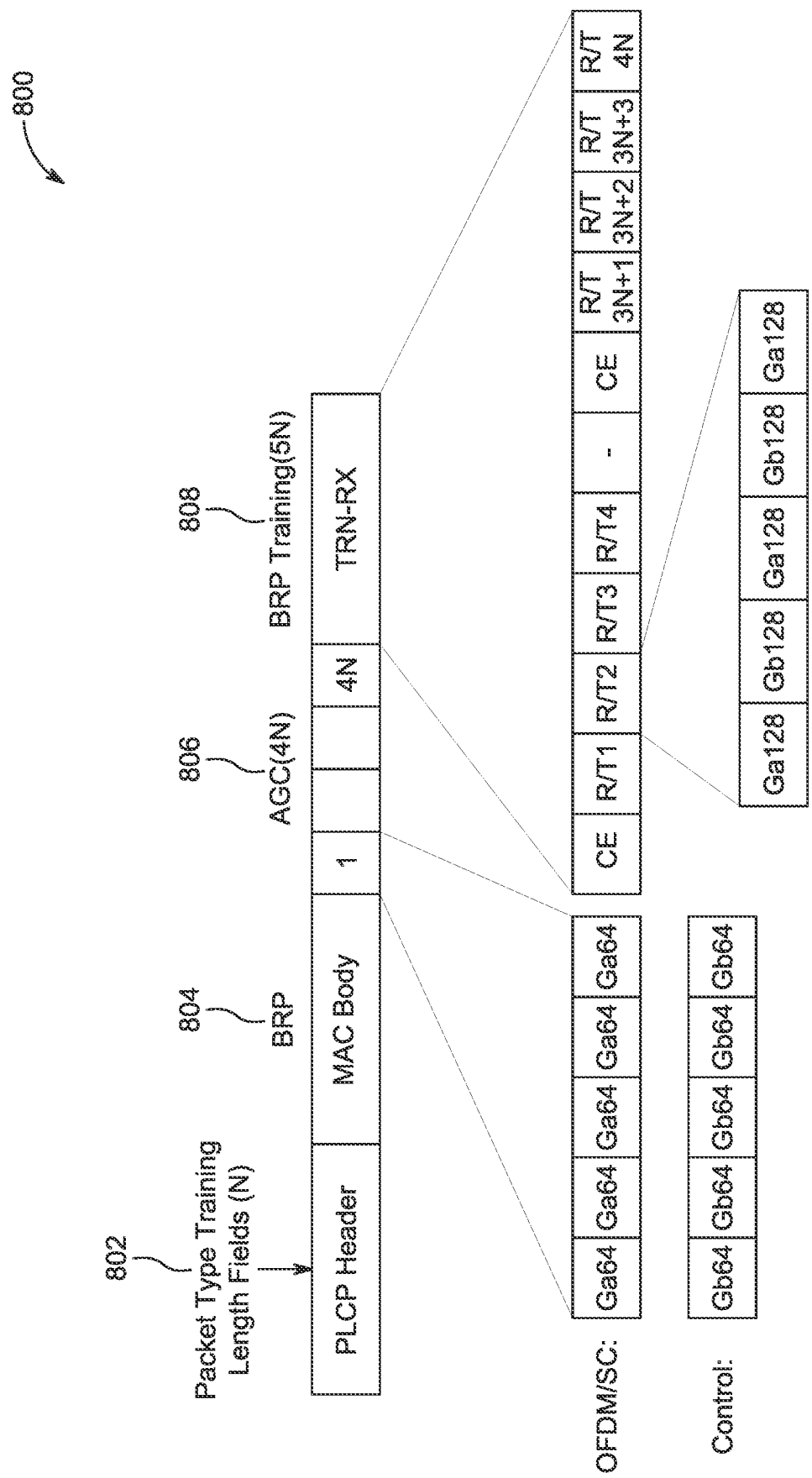
FIG. 8 is a block diagram illustrating a protocol data unit (PPDU) carrying beam refinement protocol (BRP) frame and training (TRN) fields.

In an example of the Beam Refinement Protocol (BRP), there may be two types of BRP packets: BRP-RX packets and BRP-TX packets. FIG. 8 illustrates an example of a Protocol Data Unit (PPDU), such as a Directional Multi-Gigabit (DMG) Physical Layer Convergence Procedure (PLCP) Protocol Data Unit (PPDU), which may comprise a PLCP Header (Packet Type Training Length Fields N) 802, a BRP packet 804, a training field containing an Automatic Gain Control (AGC) field 806 and a transmitter or receiver training field 808.

A value of N in FIG. 8 is the Training Length given in the header field, which indicates that the AGC 806 has 4N subfields and that the receive and/or transmit training (TRN-RX or alternatively TRN-R) field 808 has 5N subfields.

The BRP MAC frame 804 in FIG. 8 is an Action No ACK frame, which may include the following fields: Category; Unprotected DMG Action; Dialog Token; BRP Request field; DMG Beam Refinement element; and fields for Channel Measurement Feedback element 1 through Channel Measurement Feedback element k.

A TRN-RX field 808 may be appended to the DMG beacon frame, which allows enhanced directional multi-gigabit (EDMG) STAs to perform RX training using beacon frames.

Figure 9:
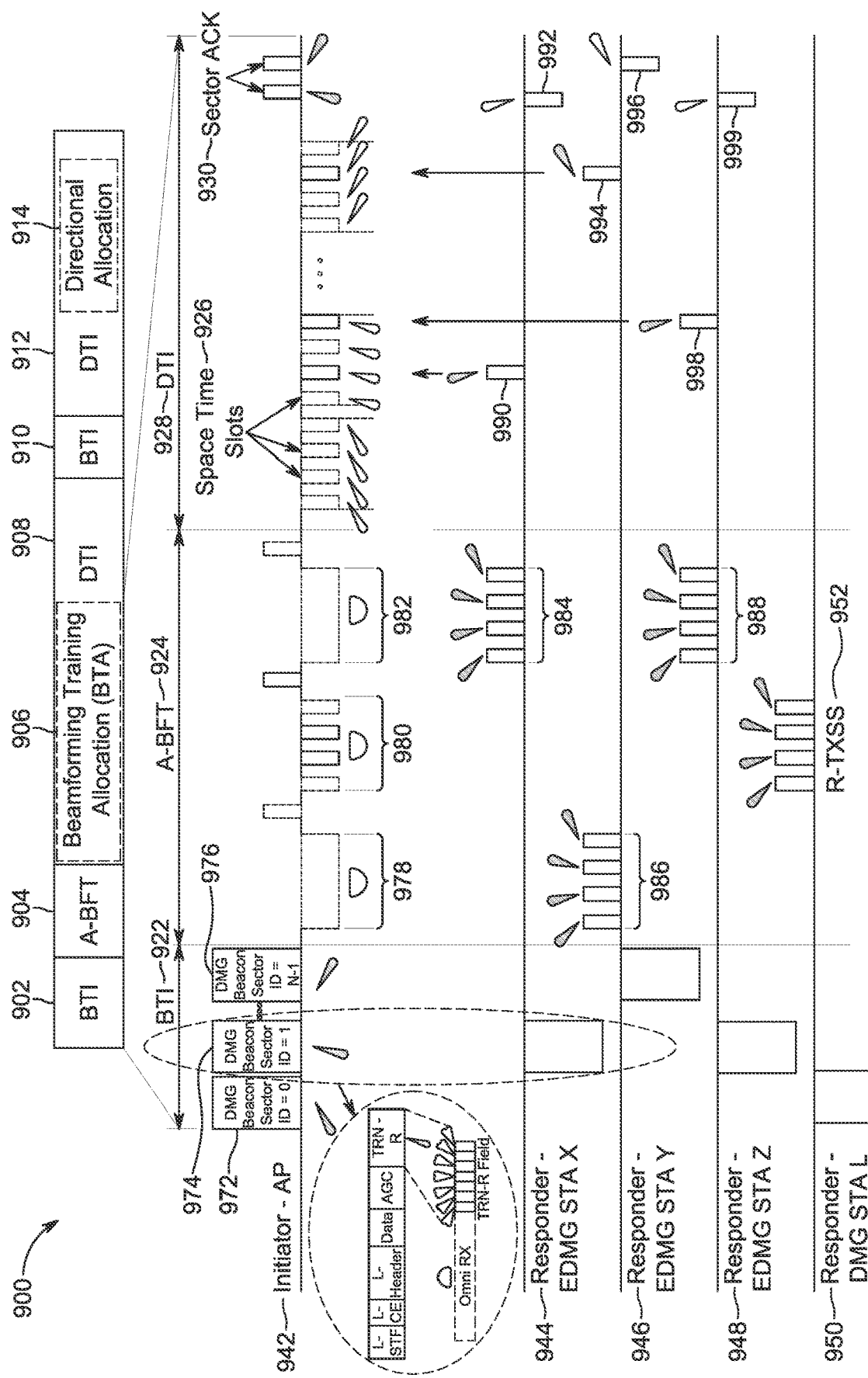
FIG. 9 is a block diagram illustrating signaling for coexistence with legacy devices.
Figure 12:
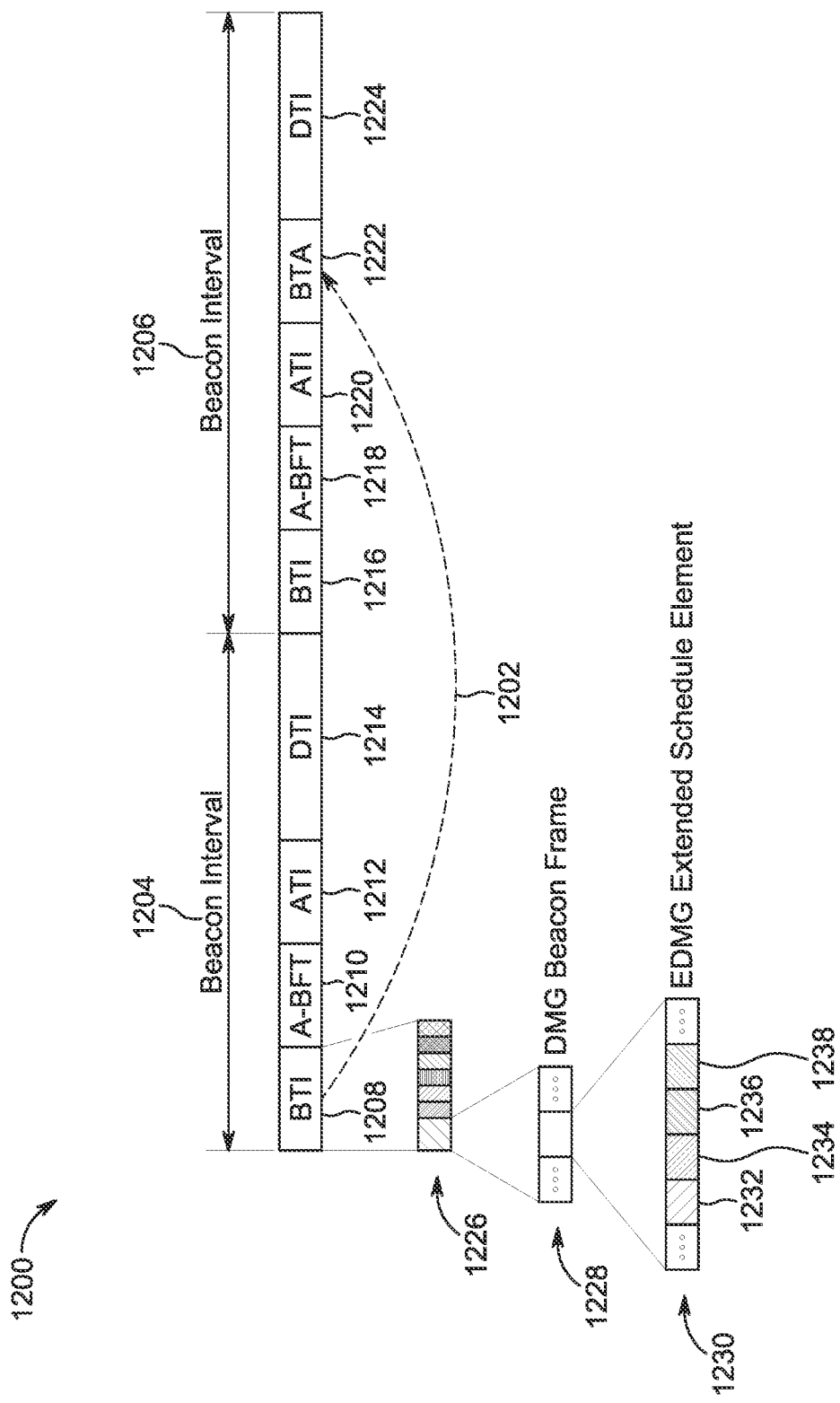
FIG. 12 is a signal diagram illustrating an exemplary flexible scheduling procedure for scheduling a beamforming training allocation (BTA) in a later Beacon Interval (BI)

FIG. 9 is a block diagram illustrating signaling for coexistence with legacy devices. In FIG. 9, the Beamforming Training Allocation (BTA) 906 is a part of the Data Transmission Interval (DTI) 908. The BTA 906 may be scheduled using one or more Enhanced Directional Multi-Gigabit (EDMG) Extended Schedule Element(s), which may define the channel scheduling for an EDMG BSS. The EDMG Extended Schedule Element 1230 may be a part of the DMG beacon frame 1228, as illustrated in FIG. 12.

An EDMG Extended Schedule Element may include an indication of which channels an allocation is scheduled on. The format of the EDMG Extended Schedule Element may include one or more of the following fields: an Element ID, a Length, an Element ID Extension, an EDMG Allocation Control, Number of Allocations, Channel Allocations 1-N, and reserved fields. As defined in the IEEE standards, the contents of the Element ID identify each 802.11 element. The Length field specifies the number of octets following the Length field. The EDMG Allocation Control comprises a Distributed Scheduling Enabled subfield, which is set to one to indicate that the distributed scheduling mechanism. The Number of Allocations field indicates the number, N, of Channel Allocation fields following it. Each Channel Allocation field may start with a Scheduling Type subfield, which defines the format of the remaining of the Channel Allocation field. The Channel Allocation field may also include the Asymmetric Beamforming Training subfield, which is set to 1 to indicate that this EDMG Extended Schedule Element schedules and allocates a Beamforming Training Allocation (BTA) in a Data Transfer Interval (DTI). The reserved fields included in the EDMG Extended Schedule Element may be used for new purposes.

In FIG. 9, during the BTI 902, the Initiator-AP 942 transmits DMG beacon frames 972, 974, 976 to the Responders 944, 946, 948, 950. During the A-BFT 924, the Responders are training their antenna sectors for communication with the Initiator-AP 942.

In this allocation, a PCP/AP may repeat the Sector Sweep in the same order as in the BTI while in the RX mode. For example, the BTA 906 allocated in the DTI 908 may have multiple space time slots 926. The receive sector for the first set of space time slots may be the same as the transmit sector used to transmit the first DMG Beacon frame. The receive sector for the second set of space time slots may be same as transmit sector used to transmit the second DMG Beacon frame.

The STAs may respond in the sector which corresponds to best sector found in transmit sector sweep (TXSS) during the BTI. For example, STA X 944 may find the second sector 974 from the AP 942, which results the best receive performance in BTI 902. It may respond in one or more slots 990 in the second space time slot set on which the Initiator-AP 942 may use the second sector 974 to receive. The Responder-EDMG STA Y 946 may find the last sector 976 from the AP 942, which results the best receive performance in BTI 902. It may respond in one or more slots 992 in the last space time slot set on which the Initiator-AP 942 may use the last sector to receive.

A Sector ACK frame 930 may be transmitted from the PCP/AP in each sector. The elements 978, 980, and 982 may indicate that A-BFT slots 924, which the Initiator-AP 942 may receive, use quasi-Omni mode. The Responder EDMG-STAs 944, 946, 948, 950 may randomly select one to transmit.

The Space Time Slots 926 may be slots allocated for STAs 944, 946, 948 to transmit frames back to the Initiator-AP 942. For each slot, the Initiator-AP 942 may have a receive sector dedicated to each of the STAs 944, 946, 948.

The time slots 984, 986, and 988 may indicate that the Responder-STAs may try to perform TXSS trainings using legacy A-BFT 924. The R-TXSS 952 may indicate that the Responder-DMG STA L performs transmit sector sweep when the Initiator-AP 942 receive beams in the quasi-Omni mode. The slots 990 and 998 show that STAs, which may be associated with the same AP sector, may transmit in the same set of space time slots. The STAs may randomly choose one or more slots in the set to transmit. The slots 992, 994, 996, and 999 may indicate that STAs may use the space time slot to transmit frames back to the AP. The transmission from STAs may or may not collide. The slots 992, 996 and 999 may indicate that STAs, which may transmit in the BTA, expect to receive sector ACKs 930 from the PCP/AP.

The BTA 906 may include two sub-phases; in a responding sub-phase, STAs may transmit responding frames to the PCP/AP and, in an acknowledgement sub-phase, the PCP/AP may transmit acknowledgement to the STAs. The PCP/AP's receive sector is specified in the DTI 908, and the PCP/AP will use this receive sector to listen during the allocation.

The PCP/AP may fragment the initiator TXSS over multiple consecutive BTIs by not transmitting a beacon frame through all sectors available to the PCP/AP in a BTI. For example, the PCP/AP may transmit a beacon frame over a subset of all sectors available to the PCP/AP in a BTI. The PCP/AP may transmit another beacon frame over another subset of all sectors available to the PCP/AP in a different BTI, and so forth. For example, this fragmentation may spread over a greater number of BTIs if multiple antennas and/or multiple channels are available and used for transmission and accordingly more TX sectors are available at the PCP/AP. By transmitting a beacon frame over only a subset of all sectors available to the PCP/AP, a STA may identify (and may select) a TX sector which has acceptable performance (e.g., a beacon frame received over that sector is detected and successfully decoded) in a single BTI. The TX sector identified by the STA may not, however, have the best performance of all sectors available to the PCP/AP. Alternately, the STA may wait until the end of total TXSS (possibly over several BTIs) to find the best TX sector.

IEEE 802.11ay adopts an enhanced SLS procedure that allows EDMG STAs to perform receiving (RX) training using beacon frames in the BTI. In the enhanced SLS procedure, the BTA may be scheduled using an EDMG Extended Schedule Element, which may be carried in DMG beacon frames transmitted in a BI. In order to receive an EDMG Extended Schedule element, the non-PCP/AP STA may need to receive at least one directional beacon frame in a current BI.

If a feedback of the optimal TX sector (i.e., the best TX sector of all sectors available to the PCP/AP) may be preferred, it may be desirable for the non-PCP/AP STA to send feedback information in the BI where the last TXSS fragment was transmitted. However, the optimal TX sector may not have been covered by the TX sectors swept in the last BI. Thus, the non-PCP/AP STA may not notice the EDMG Extended Schedule Element carried in the last BI and it may not be able to learn the BTA.

Figure 10:
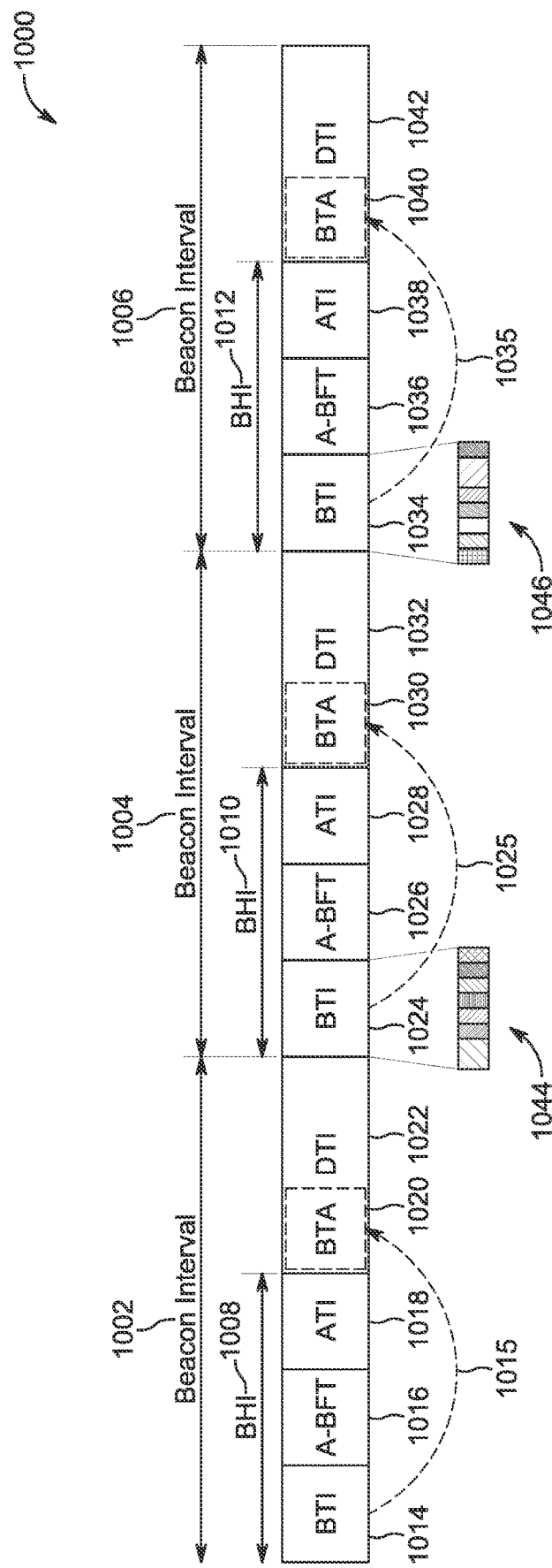
FIG. 10 is a signal diagram illustrating an exemplary fragmented transmit sector sweep (TXSS).

FIG. 10 is a signal diagram illustrating an example of a fragmented TXSS 1000. For example, in FIG. 10, the PCP/AP may have a total of 24 available TX sectors. In each BI, the TX may sweep 8 sectors. Accordingly, 3 BIs 1002, 1004, and 1006 are needed to complete the TXSS training for all 24 available TX sectors. For example, a STA may receive a beacon frame 1044 transmitted on a sector during the second BI 1004 with a receive quality above a pre-defined/pre-determined threshold. It may be desired, however, for the receiving STA to find the best sector among the 24 available TX sectors. Thus, the receiving STA may wait for the end of entire TXSS (i.e., 3 BIs). If the STA does not find a better sector during the third BI 1006 (i.e., does not receive a beacon frame with a receive quality above the pre-defined/pre-determined threshold), the STA will have missed the chance to use the BTA scheduled in the second BI 1004.

For example, a STA may determine that one of the TX sectors detected during the BTI 1024 has a receive quality above a pre-defined/pre-determined threshold. But, the STA may not know whether that sector is the best one until the PCP/AP sweeps all the sectors. Thus, the STA may not use the allocated Beamforming Training Allocation (BTA) 1030 in this BI 1004. During the BI 1006, the PCP/AP may finish the TX sweeping, but the STA may not receive anything during this interval, thus it may not use the allocated BTA 1040. The arrows 1015, 1025, and 1035 may indicate that the TX sectors detected during the BTIs 1014, 1024, 1034 may be used for beamforming trainings during the corresponding training periods, BTAs 1020, 1030, 1040. Accordingly, it may be desired to adopt a more flexible procedure to schedule enhanced SLS allocations.

One approach to enhanced SLS may have the following steps. First, a PCP/AP's TX beams/sectors and receiver's RX beams/sectors may be trained using a unified frame like the DMG beacon frame. Then, STAs may communicate with a PCP/AP during a Beamforming Training Allocation (BTA), which may be allocated by the DMG beacon frame. This may facilitate improved communications since the PCP/AP may sweep the receive beams/sectors during the BTA and receive communications signals directionally.

A PCP/AP may fragment the initiator TXSS over multiple BTIs 1014, 1024, 1034. In other words, in each BTI, a subset of the TX sectors available to the PCP/AP may be used to carry beacon frames. This may be used to facilitate a sub-optimal TXSS training.

For example, the sub-optimal TXSS training field may be set to allow the sub-optimal TXSS or immediate feedback. In the sub-optimal TXSS training, a non-PCP/AP STA may identify (and may select) one of the TX sectors in BTI 1034, which has acceptable performance (e.g., the beacon frame received over that sector is detected and successfully decoded, or the beacon frame is successfully detected with a signal to noise ratio (SNR) above a desired threshold) in a single BTI 1034. The identified TX sector may not, however, have the best performance of all sectors available to the PCP/AP.

In an EDMG Extended Schedule Element, a field may be set to indicate that sub-optimal TXSS or immediate feedback is allowed. For example, at least one field of the Extended Schedule Element such as Channel Allocations fields or reserved fields may indicate that the sub-optimal TXSS or the immediate feedback is set or allowed.

If the non-PCP/AP STA detects the beacon frame carrying an EDMG Extended Schedule Element and found that the EDMG Extended Schedule Element indicates that sub-optimal TXSS or immediate feedback is allowed, it may prepare a transmission for the scheduled BTA. Instead of waiting for the end of the entire TXSS sweeping, the non-PCP/AP may then use the assigned BTA to feedback and communicate with the PCP/AP.

Figure 11:
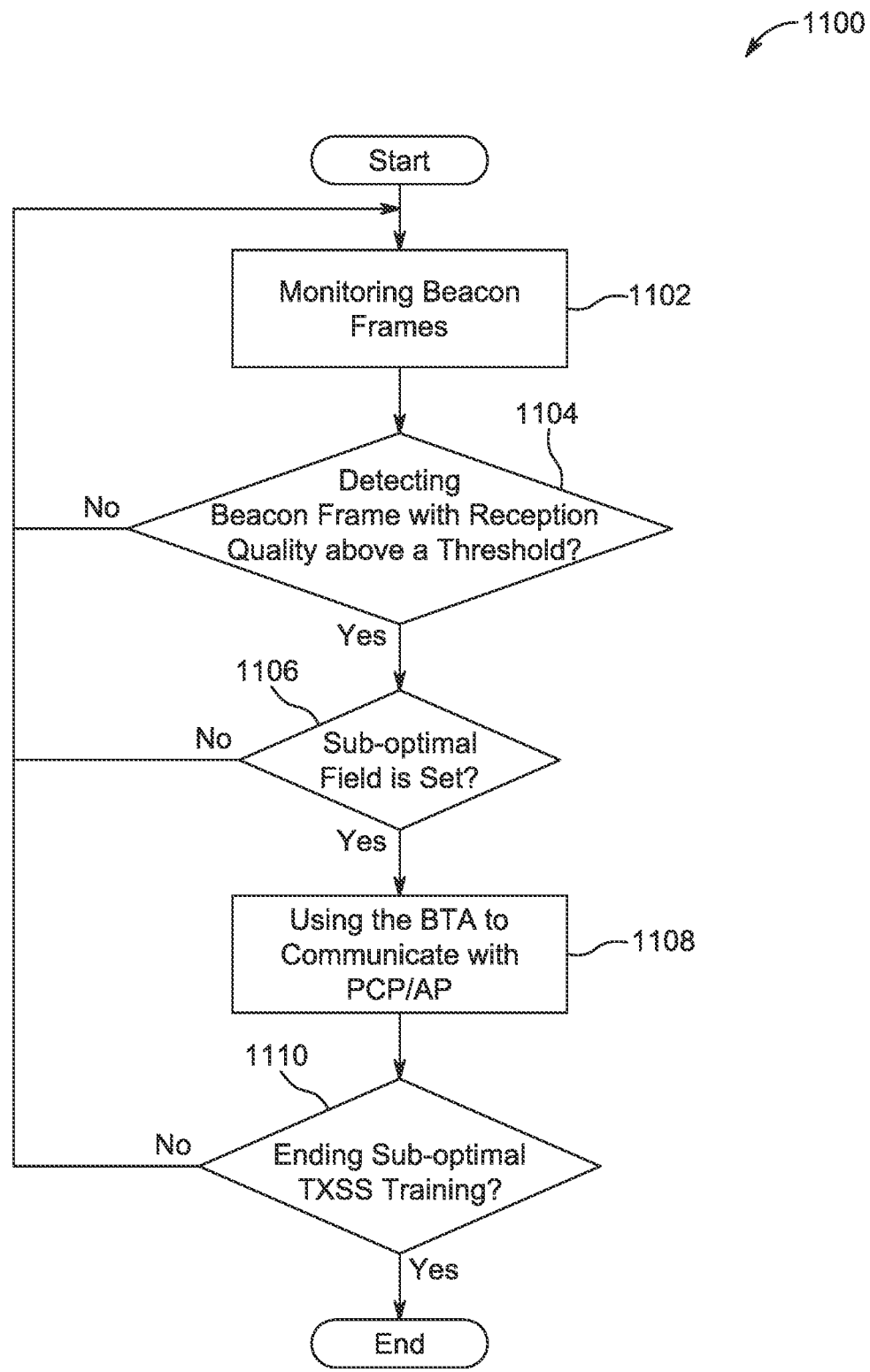
FIG. 11 is a flow chart illustrating an exemplary non-PCP/AP STA procedure for transmit sector sweep (TXSS)

FIG. 11 is a flow chart illustrating an example non-PCP/AP STA procedure for TXSS training. In a first step 1102, a non-PCP/AP STA monitors beacon frames which are part of a fragmented TXSS, e.g., beacon frames having a fragmented TXSS field set to 1.

In some cases, the non-PCP/AP STA may continue detecting beacon frames until it successfully detects at least one beacon frame within a BI, which has a signal quality above a pre-defined or pre-determined threshold. (step 1104). In the following step, it determines whether the sub-optimal field is set. (step 1106). If so, the non-PCP/AP STA use the BTA to communicate with the PCP/AP. (step 1108). When the sub-optimal TXSS training is done for all the sectors (step 1110), the non-PCP/AP STA procedure will be finished.

The received signal quality being measured may include signal-to-noise ratio (SNR), signal-to-interference-and-noise ratio (SINR), received signal strength indication (RSSI) or any other suitable type of signal quality measurement. In some cases, the threshold may be signaled explicitly to the non-PCP/AP STA in the beacon frame. In other cases, the received signal quality may be measured if the STA uses an omni-directional (or pseudo omnidirectional) beam to receive. In yet another case, the received signal quality may be measured if the STA sweeps its receive beams and records the measurements from best received beam or beams.

In some cases, the non-PCP/AP STA may detect one beacon frame meeting the signal quality threshold requirement, but instead of stopping its attempts to detect further beacon frames, it may continue monitoring for the period covered by the duration field in that beacon frame. In other words, the non-PCP/AP STA may monitor the transmission medium until the end of the Beacon Transmission Interval. The non-PCP/AP STA may determine one beacon frame transmitted to the non-PCP/AP STA by the PCP/AP STA on one TX sector with the best received signal quality, above the threshold, among all the beacon frames transmitted to the non-PCP/AP STA by the PCP/AP STA during the BI.

The non-PCP/AP STA may use the appended TRN-RX field to train its received beams. The non-PCP/AP STA may detect an EDMG Extended Schedule Element in the beacon frame, which may allocate a BTA in the following DTI within the same BI. A sub-optimal or immediate feedback field may be contained in the EDMG Extended Schedule Element, or other elements or fields in the beacon frame. For example, FIG. 12 illustrates examples of the beacon frame 1228, an EDMG Extended Schedule Element 1230, a sub-optimal field 1232, and an immediate feedback field 1234. In some cases, only STAs receiving at least one beacon frame in the BI are allowed to transmit in the BTA. In this allocation (i.e., during the allocated BTA), the PCP/AP STA may repeat a fragmented sector sweep in the same order as in the BTI in the same BI, but in the RX mode. The number of sectors swept and order of the sectors may be implicit, unless otherwise signaled explicitly in an EDMG Extended Schedule Element.

For example, if the sub-optimal field or immediate feedback field is set in an EDMG Extended Schedule Element, the STA may communicate with the PCP/AP during the BTA. Even if sub-optimal training or immediate feedback is indicated in other ways, the STA may communicate with the PCP/AP, too. For example, a sub-optimal or immediate feedback indication may be carried in the response frame transmitted from the STA to the AP to indicate that the TX sector selected by the STA may not be optimal. Further, the non-PCP/AP STA may report received channel quality corresponding to the TX sector to the PCP/AP during the BTA.

The non-PCP/AP STA may continue monitoring the remaining beacon frames in the following BIs until a countdown (CDOWN) reaches 0. In this case, the CDOWN tracks the number of remaining beacon frames in the TXSS. For example, if a PCP/AP STA has 12 transmit sectors, it may sweep 3 sectors with the beacon frame during the first BI. After the first beacon frame is transmitted, CDOWN will be 11 when the initial value of the CDOWN is 12. In other words, the non-PCP/AP STA may monitor all the fragmented TXSS beacon frames carried in consecutive BIs and may discover a better sector (e.g., a sector in which a Beacon is received with a higher receive quality, lower SNR, etc.) in a later BI. The non-PCP/AP STA may use the corresponding BTA in the same BI to communicate with the PCP/AP STA using the updated TX sector. A sub-optimal indication may be set in a response frame from the non-PCP/AP STA to the PCP/AP STA to indicate the updated TX sector is a sub-optimal sector if more BIs need to be monitored. Otherwise, the sub-optimal indication may be set (or may be not set) to indicate an optimal TX sector. Further, the received channel quality corresponding to the TX sector may be reported to the PCP/AP STA in the response frame from the non-PCP/AP STA to the PCP/AP STA.

The non-PCP/AP STA may not transmit any BTA if the fragmented TXSS is not completed. In other words, the STA may complete the TXSS and find an optimal sector and store a record of the optimal sector. The non-PCP/AP STA may communicate the optimal sector to the PCP/AP STA at a later opportunity (e.g., in a BTA or an A-BFT, or other type of allocation).

If the sub-optimal field is not set (or is set to indicate non-sub-optimal training), the non-PCP/AP STA may continue monitoring the following beacon frames until the CDOWN reaches 0. In some cases, the non-PCP/AP STA may learn the number of BIs required for the PCP/AP to complete the TXSS training by checking the TXSS Span field. The non-PCP/AP STA may thus monitor all the beacon frames in the indicated BIs. The non-PCP/AP STA may discover an optimal TX sector from the PCP/AP STA.

The non-PCP/AP STA may transmit one or more SSW frames in the first BTA or A-BFT it detects after the completion of the fragmented TXSS. Otherwise, if no BTA allocated in the BI, the non-PCP/AP STA may wait for next BTA, or may use a legacy A-BFT to feedback a sub-optimal TX sector and train its transmit sectors.

In some cases, other non-PCP/AP STA procedures may be used. For example, sub-optimal field set 1106 in FIG. 11 may be replaced with a scheduled block.

FIG. 12 is a signal diagram illustrating an exemplary flexible scheduling procedure for scheduling a Beamforming Training Allocation (BTA) 1222 in a later BI 1206 by introducing a Next Allocation field 1236 or a Periodic Allocation field 1238, to an EDMG Extended Schedule Element 1230 included in a beacon frame 1228.

The Next Allocation field 1236 or the Periodic Allocation field 1238 may be included in the EDMG Extended Schedule Element 1230. If a BTA is allocated in a later BI 1202, the reception beams/sectors may not be exactly the same as that used in the same BTI. Thus, reception beams/sectors may need to be explicitly or implicitly signaled or pre-defined.

As shown in FIG. 12, the scheduling procedure may include a first BI 1204 and a later BI 1206. The first BI 1204 may include any one or a combination of the following fields: a BTI field 1208, an A-BFT field 1210, an ATI field 1212, and a DTI field 1214. The later BTI 1206 may include any one or a combination of the following fields: a BTI field 1216, an A-BFT field 1218, an ATI field 1220, a BTA field 1222, and DTI field 1214.

As described earlier, the BTI 1208 may comprise multiple beacon frames 1226, each transmitted by the PCP/AP on a different sector of its antenna or antennas to cover all possible transmission directions. The BTI 1208 may be used for network announcement and beamforming training of the PCP/AP's antenna sectors. Stations train their antenna sectors for communication with the PCP/AP during A-BFT 1210. The PCP/AP exchanges management information with associated and beam-trained stations during the ATI 1212.

The Next Allocation field 1236 or the Periodic Allocation field 1238 may be changed or deleted before the allocation. However, if the allocation is scheduled for multiple STAs for uplink transmission, the modification of the allocation may need to be transmitted over multiple beams to reach multiple STAs.

Any one or a combination of the following rules may be applied in order to allow the PCP/AP STA to schedule an allocation, including a BTA, in a later BI. The Next Allocation field 1236 or the Periodic Allocation field 1238 may be used to allocate SP(s)/CBAP(s)/BTA(s) in a future BI. The Next Allocation field 1236 or the Periodic Allocation field 1238 may be signaled in an EDMG Extended Schedule Element 1230 or in a legacy Extended Schedule Element. If The Next Allocation field 1236 or the Periodic Allocation field 1238 is allocating a BTA, it may be signaled using an EDMG Extended Schedule Element 1230.

The Next Allocation field 1236 may be signaled as an offset from the current BI in units of BI. For example, the Next Allocation=0 may indicate that the allocation is scheduled during the current BI, while the Next Allocation=1 may indicate that the allocation is scheduled for the following BI. The Next Allocation field 1236 may be used to signal up to a dot11MaxNextBeacons BI following the last received EDMG Extended Schedule Element containing next allocation. An EDMG Extended Schedule Element carried in a BI may schedule a transmission in one or more of the following BIs. The dot11MaxNextBeacons is the maximum number of beacon intervals allowed for An EDMG Extended Schedule Element to schedule a transmission over subsequent BIs. For example, if, an EDMG Extended Schedule Element in $n^{th}$ beacon interval may carry scheduling information for $n+k^{th}$ beacon intervals. Then, k may be less than or equal to dot11MaxNextBeacons. The dot11MaxNextBeacons may be a number pre-defined or pre-determined to indicate the maximum number the Next Allocation field may use.

An allocation Start field may be signaled in an EDMG Extended Schedule Element or legacy Extended Schedule Element. With the Next Allocation field greater than 0, the Allocation Start field may indicate the time offset relative to the TBTT in that BI.

The PCP/AP STA may change the Next Allocation field by transmitting an additional EDMG Extended Schedule Element before the Next Allocation field. If the Next Allocation field is a CBAP, or if the Source AID is a broadcast/multicast AID, an EDMG Extended Schedule Element, which may change the Next Allocation field, may be repeated and transmitted by sweeping multiple beams/sectors. The PCP/AP STA may delete the Next Allocation field by transmitting an additional EDMG Extended Schedule Element before the Next Allocation field. If the Next Allocation field is a CBAP, or if the Source AID is a broadcast/multicast AID, an EDMG Extended Schedule Element, which may delete the Next Allocation field, may be repeated and transmitted by sweeping multiple beams/sectors.

Figure 13:
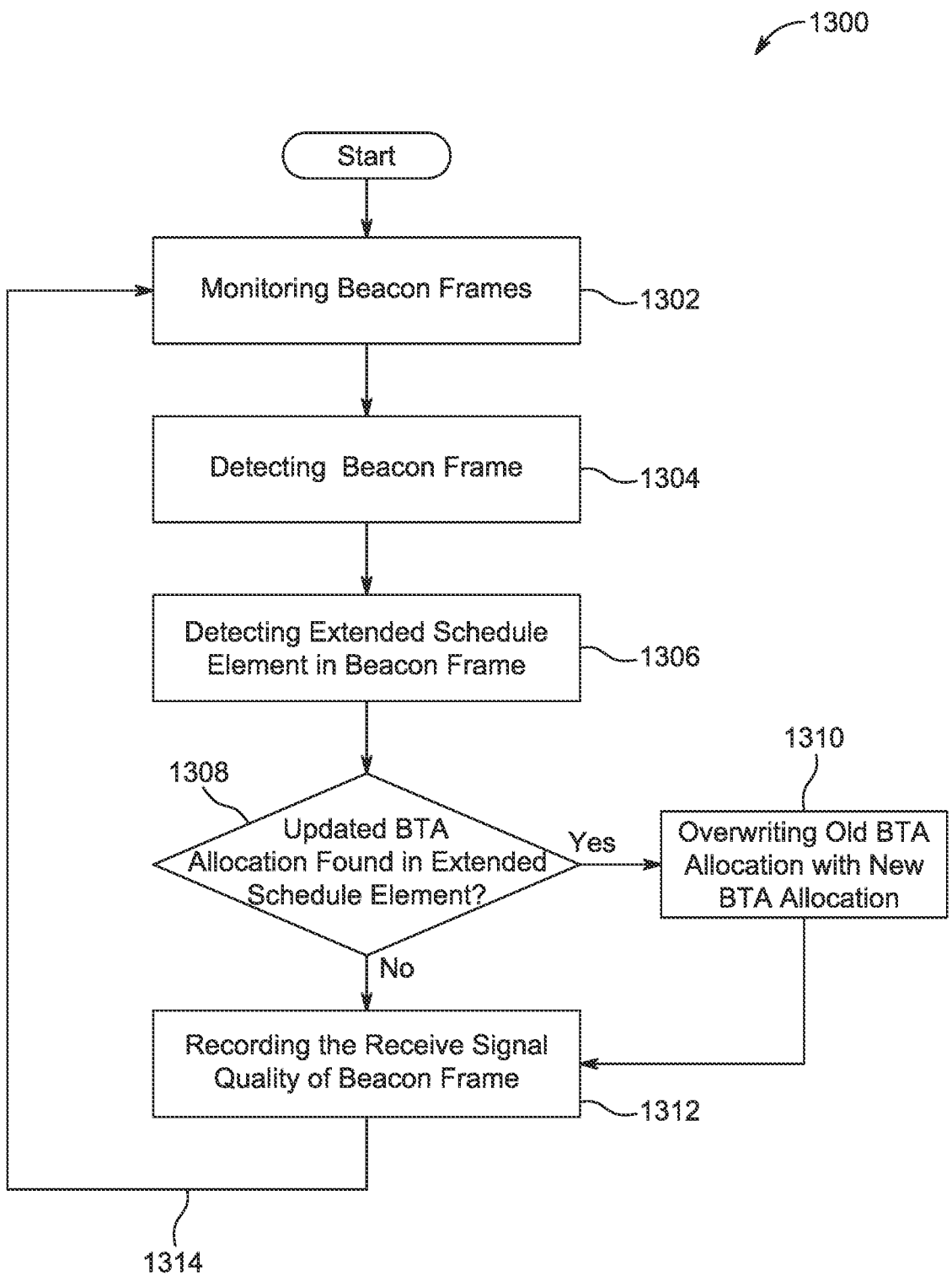
FIG. 13 is a flow chart illustrating an exemplary non-PCP/AP STA procedure for beamforming training.

FIG. 13 is a flow chart illustrating an example non-PCP/AP STA procedure for beamforming training where the PCP/AP STA performs optimal TXSS by scheduling a BTA in a later BI.

In a first step, a non-PCP/AP STA monitors beacon frames which are part of a fragmented TXSS (e.g., beacon frames having a fragmented TXSS field set to 1) (step 1302). Thereafter, the non-PCP/AP STA may successfully detect at least one of the beacon frames within a BI (step 1304). The non-PCP/AP STA may then detect an EDMG Extended Schedule Element in the beacon frames, which may allocate a BTA in a future BI (step 1306).

Next, a determination is made regarding whether the detected EDMG Extended Schedule Element includes an updated BTA allocation (step 1308). If an updated BTA allocation is not found, the non-PCP/AP STA may record the receive signal quality of the beacon frame (step 1312). The non-PCP/AP STA may use the appended TRN-RX field to train its received beams. A TRN-RX field may be appended to a beacon frame, which allows enhanced directional multi-gigabit (EDMG) STAs to perform RX training using beacon frames. The non-PCP/AP STA may measure the received signal quality of the beacon frame when the non-PCP/AP STA uses directional beam to receive the beacon frame. The non-PCP/AP STA may continue monitoring the beacon frames and searching for best one or more TX sectors/beams (step 1314).

If the updated BTA allocation is found, the non-PCP/AP STA may receive an EDMG Extended Schedule Element with an updated or modified BTA allocation and the updated or modified allocation may overwrite the old allocation (step 1310). Then, the non-PCP/AP STA may record the receive signal quality of the beacon frame (step 1312) and the non-PCP/AP STA may continue monitoring the beacon frames and searching for best TX one or more sectors/beams (step 1314).

The non-PCP/AP STA may prepare a transmission on the allocated BTA. The non-PCP/AP STA may obtain the receive beam/sector order of the PCP/AP, implicitly or explicitly, from an EDMG Extended Schedule Element. The non-PCP/AP STA may transmit in a time slot where the receive beam from the PCP/AP STA is associated with the best transmit beam from the PCP/AP STA identified by the non-PCP/AP STA using the beacon frames.

The PCP/AP STA receives beam allocation in a future BTA, which may be implicit and may be in the same order of fragmented TXSS in consecutive BIs. The PCP/AP receives beam allocation in a future BTA, which may be explicitly signaled in legacy Extended Schedule Element or EDMG Extended Schedule Element.

In a flexible scheduling procedure, a BTA may be allocated in a future BI and sub-optimal TXSS may be allowed. The non-PCP/AP STA procedure may be changed from the flexible scheduling procedure described with respect to FIG. 13. However, the rules and beam/sector allocation, which PCP/AP STA receives, described with respect to that procedure may be the same.

The following describes an example of a flexible non-PCP/AP STA scheduling procedure with sub-optimal TXSS. A non-PCP/AP STA monitors the beacon frames, which is part of the fragmented TXSS, i.e., has the Fragmented TXSS field set to 1.

The non-PCP/AP STA may successfully detect at least one beacon frame within a BI. The non-PCP/AP STA may further detect an EDMG Extended Schedule Element in the Beacon Frame, and the received signal quality may be over a pre-defined or pre-determined threshold. The EDMG Extended Schedule Element may allocate a BTA in a future BI, and may set a sub-optimal field in EDMG Extended Schedule Element or other element/field carried by the beacon frame to indicate that sub-optimal TXSS training is allowed.

The non-PCP/AP STA may record the received signal quality of the beacon frame. The non-PCP/AP STA may use the appended TRN-R (alternatively, TRN-RX) field to train its receive beams. The received signal quality may be measured when the non-PCP/AP STA may use directional beam to receive.

The non-PCP/AP STA may enter a sleep, doze, or power saving mode if the non-PCP/AP STA has not yet associated with a PCP/AP STA and the non-PCP/AP STA needs to wait for BTA to associate with the PCP/AP STA. The non-PCP/

AP STA may also enter a sleep, doze, or power saving mode if the current beams trained for the non-PCP/AP STA do not work and the non-PCP/AP STA needs to wait for BTA to complete the beam training. The non-PCP/AP STA may further enter a sleep, doze, or power saving mode if the non-PCP/AP STA does not have traffic to send to the AP and/or the non-PCP/AP STA does not have buffered traffic from AP.

The non-PCP/AP STA may wake up before the BTA and prepare transmission in the allocated BTA. The non-PCP/AP STA may know the receive beam/sector order of the PCP/AP STA implicitly or explicitly from an EDMG Extended Schedule Element. The non-PCP/AP STA may transmit in a time slot where the receive beam from PCP/AP STA may be associated with the best transmit beam from the PCP/AP STA identified by the non-PCP/AP STA using the beacon frames.

Figure 14:
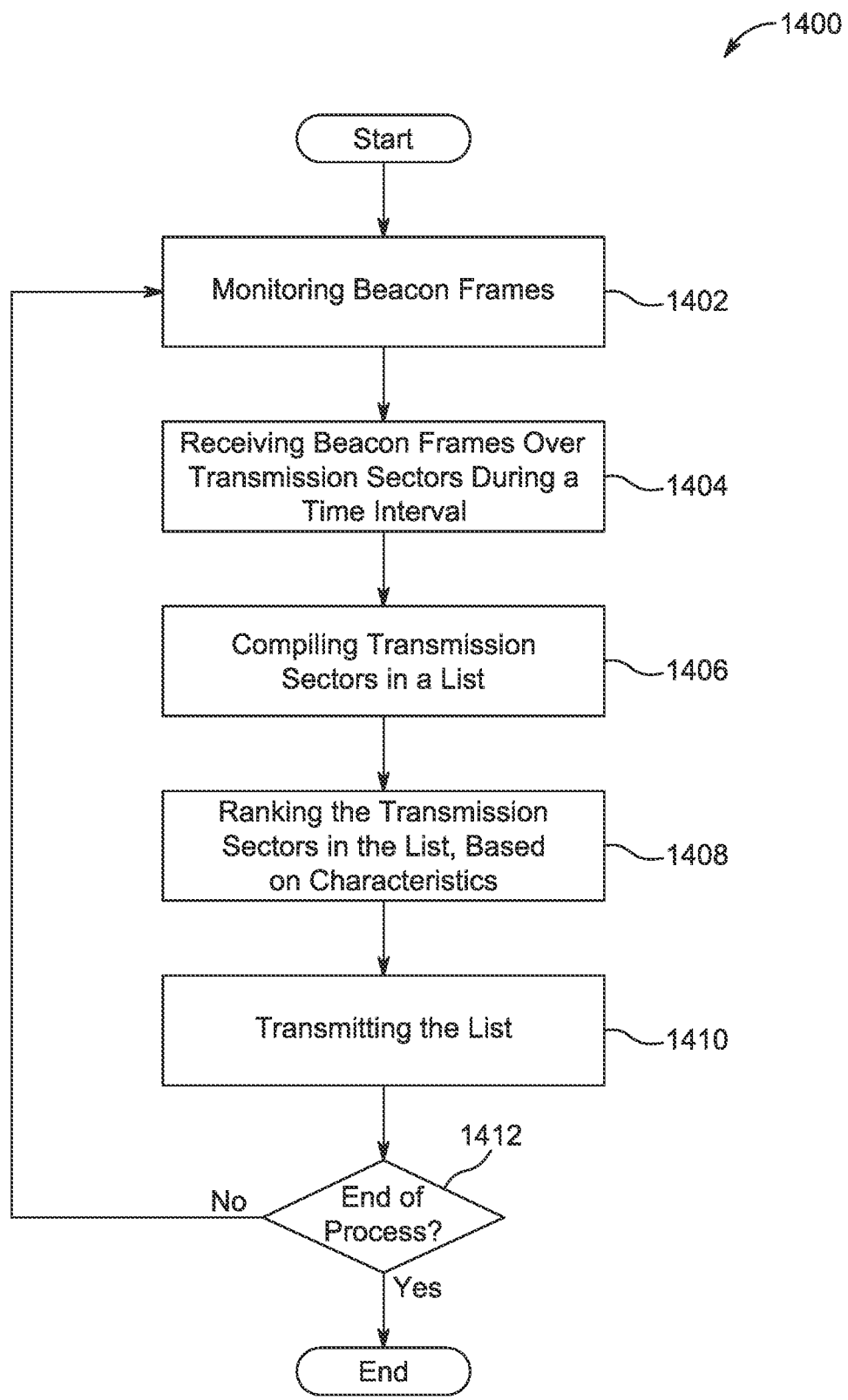
FIG. 14 is a flow chart illustrating an exemplary non-PCP/AP STA sector ranking procedure.

FIG. 14 illustrates an exemplary flow chart of sector ranking procedure, which may be used for a non-PCP/AP STA to provide feedback in fragmented TXSS. A non-PCP/AP STA may monitor beacon frames (step 1402). A non-PCP/AP STA may monitor the wireless medium continuously for beacon frames transmitted from a PCP/AP STA. For example, a non-PCP/AP STA, which is already associated with a PCP/AP STA, may monitor the wireless medium for beacon frames at the beginning of a BI, when the BI contains a beacon transmission period (interval) or A-BFT period. A STA may also begin to monitor the wireless medium for beacon frames at the start of a BTI if it has received one or more beacons previously from a PCP/AP STA, which indicate that the beacon frame is a part of a fragmented TXSS, (e.g., the beacon frame has a Fragmented TXSS field set to 1) and the start of the following BI may be derived from that beacon.

If the non-PCP/AP receives one or more beacons during the BTI (step 1404), the non-PCP/AP may compile a list of sectors in which it has received a beacon from the PCP/AP (step 1406). A WTRU or a STA may rank the sectors in the list based on their measured characteristics like RSSI, SNR, SINR or others. If the received beacon is a part of a fragmented TXSS, (e.g., as indicated by its Fragmented TXSS field), the STA may compile the one or more sectors in which the STA has received beacon in addition to the list of sectors in which it has received beacons in the same fragmented TXSS. The list of sectors may be ranked by RSSI, SNR, SINR or other measurements (step 1408). Alternatively or additionally, the list of ranked sectors may only contain one or more best sectors in terms of the measurements. Then, the non-PCP/AP STA may transmit the list to the PCP/AP STA (step 1410). The process may then either continue monitoring beacon frames (step 1402) or end (step 1412).

The non-PCP/AP STA may conduct receive-beam training using the TRN-R fields attached to a beacon which it has received. The non-PCP/AP STA may record the appropriate receive one or more beams/sectors to use when communicating with the PCP/AP using the sector in which it received a beacon from the PCP/AP STA. The non-PCP/AP STA may include the receive sector(s) in the ranked list of the PCP/AP sector in which it has received a beacon.

If non-PCP/AP STA has already associated with a PCP/AP STA, and if it has detected, after the BTI, that its sector has changed (e.g., one of the one or more sectors in its list of sectors in which it has not received a beacon), it may remove the obsolete sector from its ranked list. It may also include an indication in its ranked list of sectors that changes has been made compared to previous version of the ranked list of sectors. If the ranking of sectors has changed, the change may also be indicated in the ranked list. Alternatively or additionally, the list may include change indications (e.g., "sector entry changed", "sector entry added", "sector entry removed", "sector ranking changed" etc., or entries to that effect).

The non-PCP/AP STA may provide the list of ranked sectors to the PCP/AP STA in a modified SSW frame, short SSW frame, (short) SSW Feedback frame, (short) SSW ACK frame, or any other suitable type of frame by transmitting one or more such frames using one or more sectors in the top of the list. Such a list of ranked sectors may also include a power measurement, such as RSSI, indicating at which level the beacon was received. The ranked sectors may also include the receive/transmit sectors which the non-PCP/AP STA may use, or should preferable use, when transmitting to or receiving from the PCP/AP STA when the PCP/AP STA uses one of the ranked sectors. In some cases, the list of ranked sectors may only contain one or more best sectors in terms of some criteria, such as the best one or more sectors in terms of a desired criterion such as RSSI. To make the received power measurements comparable, the transmit power of the beacon frames through multiple directions using fragmented TXSS may be the same. Or, the transmit power or power adjustment for beacon frames may be explicitly signaled.

Such feedback list of ranked sectors may be provided during the A-BFT period, or alternatively be provided in BTA periods, as announced by the received beacon frame or announcement frame (or any other suitable type of frames) during the DTI period.

A PCP/AP STA may provide multi-channel Sector level Sweep (SLS) using its beacons or SSW frames. The following describes an example of multi-channel SLS procedure using beacons. A PCP/AP STA may indicate that a BTI is a multi-channel BTI or multi-channel SLS, either in a previous beacon or beacons, or by an announcement frame, a frame containing extended schedule element, or any other type of frames. Due to channel bonding capabilities, the targeted non-PCP/AP STAs for multi-channel SLS may be or include EDMG STAs. Without loss of generality, a multi-channel BTI or multi-channel SLS may be referred to as a multi-channel beamforming training period (MCBFT).

A PCP/AP STA may transmit beacons or SSW frames concurrently during the MCBFT on all or the subset of available channels, in the BTI or DTI period. The beacons and/or SSW frames may overlap completely in time. Prior to the MCBFT, the PCP/AP STA may transmit clear-to-send (CTS)-to-self, or other types of frames providing NAV protections for the multi-channel training. The beacon frames or SSW frames may be sent sequentially in one or more sectors on each of the channels. These multi-channel beacon frames or SSW frames may contain an indication of the primary channel of the PCP/AP STA. The beacon frames or SSW frames may contain an extended schedule element, by which STAs may report the results of their multi-channel feedback. The extended schedule element may include the channel (such as the primary channel), time slots (such as SSW slot in A-BFT, or BTA or SP in DTI). Alternatively or additionally, frames like announcement frames, sent by the PCP/AP STA during the ATI, may contain extended schedule element which may indicate the channel/schedule at which the non-PCP/AP STA should report the results of the multi-channel SLS feedback. For example, the extended schedule element may schedule the feedback of STAs on a particular channel in a particular BTA, e.g., there will be a primary channel BTA, Channel 1 BTA, channel 2 BTA, etc.

Such specific channel BTAs may be scheduled for the A-BFT, BTA and/or DTI periods, and may be scheduled solely on the primary channel, and/or on the specified channels.

Multiple TRN-R fields may be appended to the beacon frames or SSW frames. These TRN-R fields may provide receive beamforming training for STAs that have received the beacons or SSW frames in a particular sector on a particular channel. For example, the initiator may repeat the TRN-R fields, while the responder sweeps its receive beam to be trained.

A non-PCP/AP STA that has not associated with a PCP/AP STA, may use the primary channel indication and the scheduling indicated in the beacon frame/SSW frames to provide its feedback to the PCP/AP. Alternatively, the non-PCP/AP STA may provide feedback for the SLS on the particular channel on which it has received the beacon/SSW. The non-PCP/AP STA may thereafter conduct association on that particular channel. Alternatively, the non-PCP/AP STA may be allocated a SP or CBP during which the non-PCP/AP STA, may conduct SLS on the primary channel with the PCP/AP STA. The non-PCP/AP STA may thereafter conduct association with the PCP/AP STA on the primary channel. If more than one channel has been trained during the multi-channel SLS, the non-PCP/AP may provide a list of one or more such sectors for each of the channels. Such a list of sectors for a particular channel may be ranked by some criteria, such as RSSI. In addition, the list of preferred sectors may be ranked across all channels by some criteria, such as RSSI.

A non-PCP/AP STA that has already been associated with the PCP/AP may use the following multi-channel SLS procedure. The non-PCP/AP may have already associated and conducted SLS with a PCP/AP on the primary channel of the PCP/AP. The PCP/AP STA may schedule one or more associated non-PCP/AP STAs for multi-channel SLS. The scheduled multi-channel SLS may be using beacons or SSW frames or other types of frames, e.g., in the BTI, A-BFT or DTI periods. Such multi-channel SLS may be scheduled using an extended schedule element in a beacon or announcement frame or any other type of frames.

A PCP/AP STA may transmit beacons or SSW frames concurrently during the MCBFT on all or the subset of available channels, in the BTI or DTI period. Prior to the MCBFT, the PCP/AP may transmit CTS-to-self or other type of frames providing NAV protections for the multi-channel training.

For example, the SLS for a particular channel may be scheduled at a particular SP/CBP/BTI. The beacon frames or SSW frames may be sent sequentially in one or more sectors on each of the channels. The beacon frames or SSW frames may contain an extended schedule element for non-PCP/AP STAs to report the results of their multi-channel feedback. Such an extended scheduling element may include the channel, such as the primary channel, time slots, such as SSW slot in A-BFT, or BTA or SP in DTI. Alternatively or additionally, frames like announcement frame, sent by the PCP/AP in the ATI, may include an extended schedule element which may indicate the channel/schedule at which the non-PCP/AP STA should report the results of the multi-channel SLS feedback. For example, the scheduling may schedule the feedback of STAs on a particular channel in a particular BTA, e.g., there will be a primary channel BTA, Channel 1 BTA, channel 2 BTA, etc. Such specific channel BTA may be scheduled for the A-BFT, BTA and/or DTI periods, and they may be scheduled solely on the primary channel, and/or on the specific channels.

Multiple TRN-R fields may be appended to the beacon frames or SSW frames. These TRN-R fields may provide receive beamforming training for STAs that have received the beacons or SSW frames in a particular sector on a particular channel. If more than one channel has been training during the multi-channel SLS, the non-PCP/AP STA may provide a list of one or more sectors for each of the channels. Such a list of sectors for a particular channel may be ranked by some criteria, such as RSSI. In addition, the list of preferred sectors may be ranked across all channels by some criteria, such as RSSI.

As shown in FIG. 9A, legacy users 950, which may not be able to transmit in the BTA, may use A-BFT 924 for feedback and train their antenna sectors. STAs 944, 946, 948, however, may be able to feedback using both A-BFT 924 and BTA 928. Mechanisms and signaling may be needed to provide some level of fairness between legacy devices and enhanced devices. Example approaches include allowing an enhanced STA to use BTA only, enabling an enhanced STA to decide whether to use BTA and/or A-BFT, or the choice of whether to use BTA or A-BFT may be determined and configured by the PCP/AP.

The following procedure may be followed to provide for legacy device coexistence. A PCP/AP STA may maintain a list of capabilities of associated non-PCP/AP STAs. The PCP/AP STA may have information regarding the number of BTA capable non-PCP/AP STAs and the number of BTA non-capable non-PCP/AP STAs with which it is associated. The PCP/AP may predict the BTA capable and non-capable STAs in the BSS (including unassociated STAs) based on these numbers. For example, the PCP/AP STA may calculate the predicted numbers based on the ratio of #BTA capable STA/#BTA non-capable STA.

The PCP/AP may determine to allow all of the BTA capable STAs to use BTA only. This option may be signaled in the Beacon Frame. The PCP/AP may alternately determine to allow all of the BTA capable STAs to use A-BFT. This option may be signaled in the Beacon Frame. The PCP/AP may alternately determine to allow some of the BTA capable STAs to use A-BFT. In some cases, the percentage of the BTAs which are allowed to use A-BFT may be signaled. For example, a discrete percentage may be signaled in the Beacon Frame (e.g., 20%, 40%, 60%, 80% 100%). In some cases, a BTA capable STA, which receives the percentage number, may randomly choose a number R_percentage between 1 to 100. If this random number is smaller than the given Percentage number, i.e., R_percentage<Percentage, the STA may be able to or choose to transmit using A-BFT. Otherwise the STA may transmit on the BTA. The PCP/AP STA may update the ratio by updating the number of BTA capable and non-capable non-PCP/AP STAs.

Although the various features and elements herein are described in particular combinations, each feature or element may be used alone without the other features and elements of the preferred embodiments or in various combinations with or without other features and elements of the present disclosure. Although the solutions described herein are described with respect to IEEE 802.11 specific protocols, it is understood that the solutions described herein are not restricted to IEEE 802.11 applications, but are applicable to other wireless systems and other as well.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a first communication device, the method comprising:
    transmitting a plurality of beacon frames in a corresponding plurality of transmit sectors, wherein the plurality of beacon frames are transmitted within a beacon interval;
    receiving, from a second communication device, a first transmission including information representing a first ranked list of at least a first subset of the plurality of transmit sectors, wherein the first ranked list is based on a characteristic, observed by the second communication device, of the at least the first subset of the plurality of transmit sectors, wherein the first transmission is received in a sector corresponding to one of the transmit sectors of the first subset of the plurality of transmit sectors; and
    receiving, from a third communication device, a second transmission including information representing a second ranked list of at least a second subset of the plurality of transmit sectors, wherein the second ranked list is based on a characteristic, observed by the third communication device, of the at least the second subset of the plurality of transmit sectors, wherein the second transmission is received in a sector corresponding to one of the transmit sectors of the second subset of the plurality of transmit sectors.

2. The method of claim 1, wherein the first communication device, the second communication device, and the third communication device are each one of: a wireless transmit receive unit, a wireless station (STA), an access point (AP), or a base station.

3. The method of claim 1, wherein the plurality of beacon frames are transmitted in a beacon interval (BI) comprising at least one of a beacon transmission interval (BTI) or an association beamforming training (A-BFT) interval.

4. The method of claim 1, wherein at least one of the characteristics of the transmit sectors, observed by the second communication device or the third communication device, comprise at least one of a received signal strength indication (RSSI), a signal-to-noise ratio (SNR), or a signal-to-interference-and-noise ratio (SINR).

5. The method of claim 4, wherein at least one of the first transmission or the second transmission include the at least one of the received signal strength indication (RSSI), the signal-to-noise ratio (SNR), or the signal-to-interference-and-noise ratio (SINR).

6. The method of claim 1, wherein at least one of the sector used to receive the first transmission or the sector used to receive the second transmission correspond to a highest ranked transmit sector of the plurality of transmit sectors.

7. The method of claim 1, wherein at least one of the first transmission or the second transmission is received during a modified sector sweep (SSW) frame, a SSW frame, a SSW feedback frame, or a SSW acknowledgement (ACK) frame.

8. The method of claim 1, wherein at least one of the first transmission or the second transmission is received during a beamforming training allocation (BTA) period.

9. The method of claim 8, wherein information indicating the BTA period is provided to at least one of the second communication device or the third communication device in one of the plurality of beacon frames or in an announcement frame transmitted during a data transmission interval (DTI).

10. A first communication device comprising:
    a processor;
    a transmitter; and
    a receiver;
    wherein the processor and the transmitter are configured to transmit a plurality of beacon frames in a corresponding plurality of transmit sectors, wherein the plurality of beacon frames are transmitted within a beacon interval;
    wherein the receiver is configured to receive, from a second communication device, a first transmission including information representing a first ranked list of at least a first subset of the plurality of transmit sectors, wherein the first ranked list is based on a characteristic, observed by the second communication device, of the at least the first subset of the plurality of transmit sectors, wherein the first transmission is received in a sector corresponding to one of the transmit sectors of the first subset of the plurality of transmit sectors; and
    wherein the receiver is configured to receive, from a third communication device, a second transmission including information representing a second ranked list of at least a second subset of the plurality of transmit sectors, wherein the second ranked list is based on a characteristic, observed by the third communication device, of the at least the second subset of the plurality of transmit sectors, wherein the second transmission is received in a sector corresponding to one of the transmit sectors of the second subset of the plurality of transmit sectors.

11. The first communication device of claim 10, wherein the first communication device, the second communication device, and the third communication device are each one of: a wireless transmit receive unit, a wireless station (STA), an access point (AP), or a base station.

12. The first communication device of claim 10, wherein the plurality of beacon frames are transmitted in a beacon interval (BI) comprising at least one of a beacon transmission interval (BTI) or an association beamforming training (A-BFT) interval.

13. The first communication device of claim 10, wherein at least one of the characteristics of the transmit sectors, observed by the second communication device or the third communication device, comprise at least one of a received signal strength indication (RSSI), a signal-to-noise ratio (SNR), or a signal-to-interference-and-noise ratio (SINR).

14. The first communication device of claim 13, wherein at least one of the first transmission or the second transmission include the at least one of the received signal strength indication (RSSI), the signal-to-noise ratio (SNR), or the signal-to-interference-and-noise ratio (SINR).

15. The first communication device of claim 10, wherein at least one of the sector used to receive the first transmission or the sector used to receive the second transmission correspond to a highest ranked transmit sector of the plurality of transmit sectors.

16. The first communication device of claim 10, wherein at least one of the first transmission or the second transmission is received during a modified sector sweep (SSW) frame, a SSW frame, a SSW feedback frame, or a SSW acknowledgement (ACK) frame.

17. The first communication device of claim 10, wherein at least one of the first transmission or the second transmission is received during a beamforming training allocation (BTA) period.

18. The first communication device of claim 17, wherein information indicating the BTA period is provided to at least one of the second communication device or the third communication device in one of the plurality of beacon frames or in an announcement frame transmitted during a data transmission interval (DTI).

* * * * *